(12) United States Patent
Fan et al.

(10) Patent No.: US 10,645,586 B2
(45) Date of Patent: May 5, 2020

(54) COORDINATED RESOURCE PARTITIONING

(71) Applicant: QUALCOMM Incorporated, San Diego, CA (US)

(72) Inventors: Michael Mingxi Fan, San Diego, CA (US); Juan Montojo, San Diego, CA (US); Naga Bhushan, San Diego, CA (US); Aleksandar Damnjanovic, Del Mar, CA (US); Ahmed Kamel Sadek, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 16 days.

(21) Appl. No.: 15/474,196

(22) Filed: Mar. 30, 2017

(65) Prior Publication Data

US 2018/0109957 A1 Apr. 19, 2018

Related U.S. Application Data

(60) Provisional application No. 62/407,772, filed on Oct. 13, 2016.

(51) Int. Cl.
*H04W 16/02* (2009.01)
*H04W 72/10* (2009.01)
(Continued)

(52) U.S. Cl.
CPC .......... *H04W 16/02* (2013.01); *H04W 16/14* (2013.01); *H04W 24/10* (2013.01); *H04W 56/001* (2013.01); *H04W 72/0406* (2013.01); *H04W 72/0446* (2013.01); *H04W 72/10* (2013.01); *H04W 74/02* (2013.01)

(58) Field of Classification Search
CPC ... H04W 16/02; H04W 16/14; H04W 56/001; H04W 24/10; H04W 72/0406; H04W 72/0446; H04W 72/10; H04W 74/02
See application file for complete search history.

(56) References Cited

U.S. PATENT DOCUMENTS

2002/0105970 A1* 8/2002 Shvodian ............ H04W 16/14
370/468
2015/0148053 A1* 5/2015 Patel ................. H04W 72/0426
455/452.1

(Continued)

OTHER PUBLICATIONS

ISA/EP, International Search Report and Written Opinion of the International Searching Authority, Int'l Application No. PCT/US2017/054260, Dec. 12, 2017, European Patent Office, Rijswijk, NL, 12 pgs.

*Primary Examiner* — George Eng
*Assistant Examiner* — Hung K Du
(74) *Attorney, Agent, or Firm* — Holland & Hart LLP

(57) ABSTRACT

The described techniques provide for partitioning resources to coordinate wireless communications between one or more network operating entities within a shared spectrum. Partitioning resources may include assigning certain types of communication for each network operating entity to certain time intervals within a larger time frame. For example, a network operating entity may be assigned time intervals for exclusive communication, time intervals for prioritized communication with respect to other network operating entities, and time intervals for opportunistic communication.

30 Claims, 15 Drawing Sheets

(51) Int. Cl.
*H04W 72/04* (2009.01)
*H04W 56/00* (2009.01)
*H04W 24/10* (2009.01)
*H04W 16/14* (2009.01)
*H04W 74/02* (2009.01)

(56) References Cited

U.S. PATENT DOCUMENTS

| | | | |
|---|---|---|---|
| 2016/0255641 A1* | 9/2016 | Koorapaty | H04W 52/0216 |
| | | | 370/329 |
| 2017/0019909 A1* | 1/2017 | Si | H04L 47/27 |
| 2017/0231007 A1* | 8/2017 | Yang | H04W 76/14 |
| 2018/0242234 A1* | 8/2018 | Semaan | H04W 48/18 |

* cited by examiner

COORDINATED RESOURCE PARTITIONING

CROSS REFERENCES

The present Application for Patent claims priority to U.S. Provisional Patent Application No. 62/407,772 by FAN, et al., entitled "COORDINATED RESOURCE PARTITIONING," filed Oct. 13, 2016, assigned to the assignee hereof, and which is hereby expressly incorporated by reference herein in its entirety.

BACKGROUND

The following relates generally to wireless communication, and more specifically to coordinated resource partitioning.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations, each simultaneously supporting communication for multiple communication devices, which may be otherwise known as user equipment (UE).

A wireless communications system may operate over shared spectrum, meaning that the wireless communications system includes one or more frequency bands that may be shared by multiple network operating entities. In some instances, sharing of the frequency bands may include subdividing the frequency bands into ever-smaller bands dedicated for use by specific network operating entities. In other instances, at least portions of band spectrum may be available for use by more than one network operating entity.

Use of the available band spectrum may then be subject to a contention procedure that may involve the use of a medium-sensing procedure. For example, to avoid interference between different devices or between devices operated by different network operating entities, the wireless communications system may employ medium-sensing procedures, such as listen-before-talk (LBT), to ensure a particular channel is clear before transmitting a message. Medium-sensing procedures may utilize substantial signaling overhead and may result in increased latency, thus adversely affecting the use of shared spectrum by multiple network operating entities. Accordingly, improved procedures for allocating and using shared spectrum between network operating entities are desirable.

SUMMARY

The described techniques provide for partitioning of resources to coordinate wireless communications between one or more network operating entities within a shared spectrum. Partitioning of resources may include assigning certain types of communication for each network operating entity to certain time intervals within a larger time frame. For example, a network operating entity may be assigned time intervals for exclusive communication, time intervals for prioritized communication with respect to other network operating entities, and time intervals for opportunistic communication. By allocating time intervals in this way to each network operating entity, several network operating entities may efficiently communicate over shared spectrum while reducing interference and signaling overhead.

A method of wireless communication is described. The method may include identifying a frame in a shared radio frequency spectrum band shared by a plurality of network operating entities, identifying a first plurality of sub-intervals in the frame for exclusive use by a network operating entity, identifying a second plurality of sub-intervals in the frame for prioritized use by the network operating entity, identifying a third plurality of sub-intervals in the frame for opportunistic use by the network operating entity, and communicating, using one of the identified sub-intervals, with a wireless node associated with the network operating entity.

An apparatus for wireless communication is described. The apparatus may include means for identifying a frame in a shared radio frequency spectrum band shared by a plurality of network operating entities, means for identifying a first plurality of sub-intervals in the frame for exclusive use by a network operating entity, means for identifying a second plurality of sub-intervals in the frame for prioritized use by the network operating entity, means for identifying a third plurality of sub-intervals in the frame for opportunistic use by the network operating entity, and means for communicating, using one of the identified sub-intervals, with a wireless node associated with the network operating entity.

Another apparatus for wireless communication is described. The apparatus may include a processor, memory in electronic communication with the processor, and instructions stored in the memory. The instructions may be operable, when executed by the processor, to cause the apparatus to identify a frame in a shared radio frequency spectrum band shared by a plurality of network operating entities, identify a first plurality of sub-intervals in the frame for exclusive use by a network operating entity, identify a second plurality of sub-intervals in the frame for prioritized use by the network operating entity, identify a third plurality of sub-intervals in the frame for opportunistic use by the network operating entity, and communicate, using one of the identified sub-intervals, with a wireless node associated with the network operating entity.

A non-transitory computer readable medium for wireless communication is described. The non-transitory computer-readable medium may include instructions operable to cause a processor to identify a frame in a shared radio frequency spectrum band shared by a plurality of network operating entities, identify a first plurality of sub-intervals in the frame for exclusive use by a network operating entity, identify a second plurality of sub-intervals in the frame for prioritized use by the network operating entity, identify a third plurality of sub-intervals in the frame for opportunistic use by the network operating entity, and communicate, using one of the identified sub-intervals, with a wireless node associated with the network operating entity.

Some examples of the method, apparatus, and non-transitory computer-readable medium described above may further include processes, features, means, or instructions for communicating control information with the wireless node during at least one of the first plurality of sub-intervals. In some examples of the method, apparatus, and non-transitory computer-readable medium described above, the control information comprises synchronization information, system information, paging information, random access information, or a combination thereof.

Some examples of the method, apparatus, and non-transitory computer-readable medium described above may further include processes, features, means, or instructions for communicating data with the wireless node during at least one of the second plurality of sub-intervals. Some examples of the method, apparatus, and non-transitory computer-readable medium described above may further include processes, features, means, or instructions for communicating control information, paging information, or both with the wireless node during the at least one of the second plurality of sub-intervals.

In some examples of the method, apparatus, and non-transitory computer-readable medium described above, a location of at least the first plurality of sub-intervals, the second plurality of sub-intervals, or the third plurality of sub-intervals within the frame may be determined by a network operating entity coordinator. In some examples of the method, apparatus, and non-transitory computer-readable medium described above, the network operating entity coordinator comprises a spectrum access system (SAS).

In some examples of the method, apparatus, and non-transitory computer-readable medium described above, a location of at least the first plurality of sub-intervals, the second plurality of sub-intervals, or the third plurality of sub-intervals within the frame may be autonomously determined based at least in part on a number of the plurality of network operating entities.

Some examples of the method, apparatus, and non-transitory computer-readable medium described above may further include processes, features, means, or instructions for measuring for communications from other network operating entities during at least one of the third plurality of sub-intervals. Some examples of the method, apparatus, and non-transitory computer-readable medium described above may further include processes, features, means, or instructions for determining, based at least in part on the measuring, an absence of communications from the other network operating entities during the at least one of the third plurality of sub-intervals. Some examples of the method, apparatus, and non-transitory computer-readable medium described above may further include processes, features, means, or instructions for communicating data during the at least one of the third plurality of sub-intervals based at least in part on the determining.

Some examples of the method, apparatus, and non-transitory computer-readable medium described above may further include processes, features, means, or instructions for determining, based at least in part on the measuring, a presence of communications from the other network operating entities during the at least one of the third plurality of sub-intervals. Some examples of the method, apparatus, and non-transitory computer-readable medium described above may further include processes, features, means, or instructions for refraining from communicating data during the at least one of the third plurality of sub-intervals based at least in part on the determining. In some examples of the method, apparatus, and non-transitory computer-readable medium described above, the measuring for communications comprises a LBT procedure.

Some examples of the method, apparatus, and non-transitory computer-readable medium described above may further include processes, features, means, or instructions for identifying, during at least one of the third plurality of sub-intervals, signaling from a higher priority network operating entity, the signaling indicating that the higher priority network operating entity will not communicate during the at least one of the third plurality of sub-intervals, the higher priority network operating entity having a higher communication priority during the at least one of the third plurality of sub-intervals than the network operating entity. Some examples of the method, apparatus, and non-transitory computer-readable medium described above may further include processes, features, means, or instructions for communicating data during the at least one of the third plurality of sub-intervals based at least in part on the signaling.

Some examples of the method, apparatus, and non-transitory computer-readable medium described above may further include processes, features, means, or instructions for identifying, during at least one of the third plurality of sub-intervals, signaling from a higher priority network operating entity, the signaling indicating that the higher priority network operating entity will communicate during the at least one of the third plurality of sub-intervals, the higher priority network operating entity having a higher communication priority during the at least one of the third plurality of sub-intervals than the network operating entity. Some examples of the method, apparatus, and non-transitory computer-readable medium described above may further include processes, features, means, or instructions for refraining from communicating data during the at least one of the third plurality of sub-intervals based at least in part on the signaling.

Some examples of the method, apparatus, and non-transitory computer-readable medium described above may further include processes, features, means, or instructions for indicating to a lower priority network operating entity that communication with the wireless node will occur during the at least one of the second plurality of sub-intervals, the lower priority network operating entity having a lower communication priority than the network operating entity during the at least one of the second plurality of sub-intervals.

Some examples of the method, apparatus, and non-transitory computer-readable medium described above may further include processes, features, means, or instructions for indicating to a lower priority network operating entity that communication with the wireless node will not occur during at least one of the second plurality of sub-intervals, the lower priority network operating entity having a lower communication priority during the at least one of the second plurality of sub-intervals than the network operating entity.

Some examples of the method, apparatus, and non-transitory computer-readable medium described above may further include processes, features, means, or instructions for receiving synchronization information from an additional wireless node associated with another network operating entity. Some examples of the method, apparatus, and non-transitory computer-readable medium described above may further include processes, features, means, or instructions for communicating with the wireless node based at least in part on the synchronization information.

Some examples of the method, apparatus, and non-transitory computer-readable medium described above may further include processes, features, means, or instructions for communicating with the wireless node using coordinated multi-point communication.

DETAILED DESCRIPTION

Wireless communications systems operated by different network operating entities (e.g., network operators) may share spectrum. In some preferred instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

Aspects of the disclosure are initially described in the context of wireless communications systems. Aspects of the disclosure are also described in the context of a timing diagram and a process flow diagram. Aspects of the disclosure are further illustrated by and described with reference to apparatus diagrams, system diagrams, and flowcharts that relate to coordinated resource partitioning.

Figure 1:
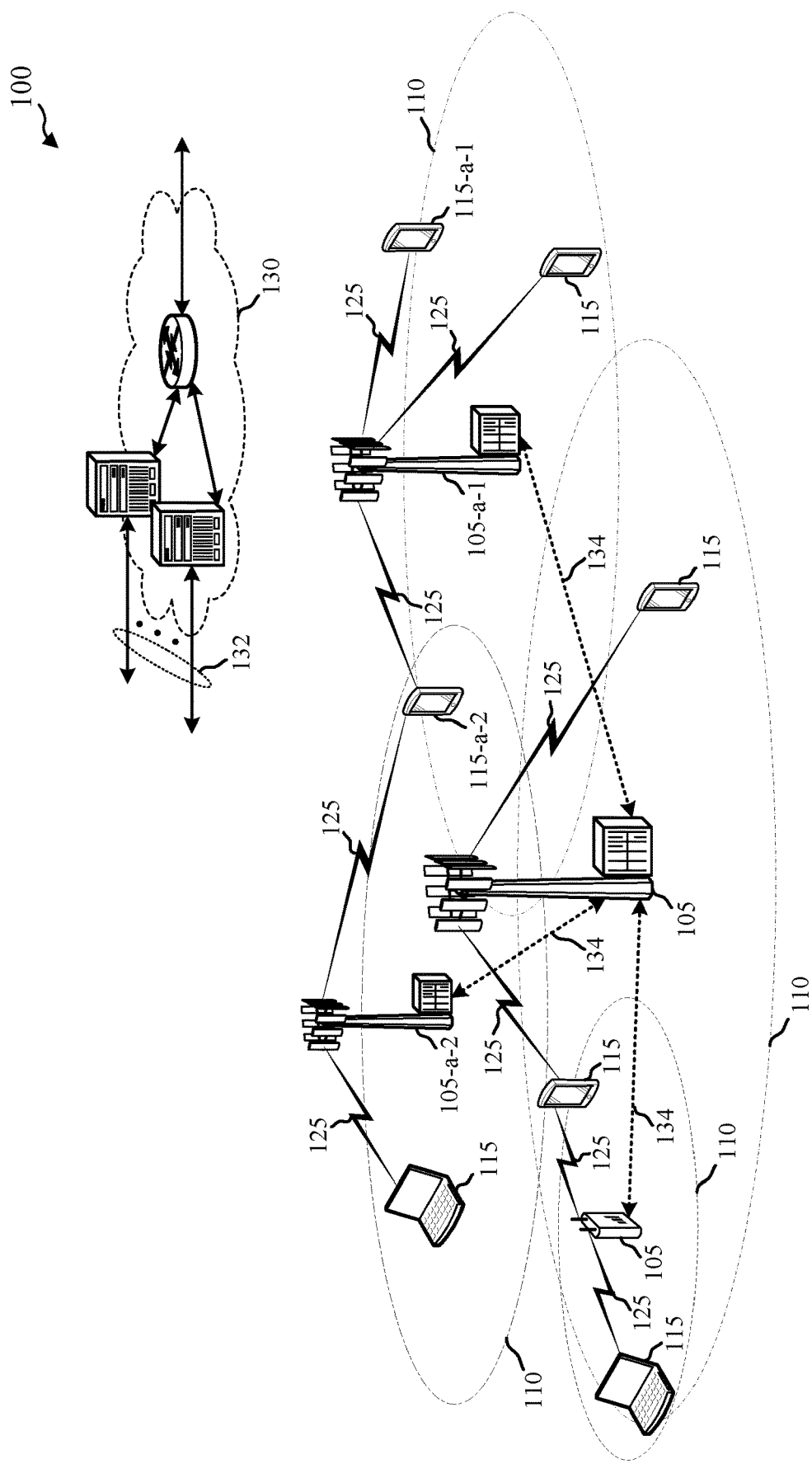
FIG. 1 illustrates an example of a system for wireless communication that supports coordinated resource partitioning in accordance with aspects of the present disclosure.

FIG. 1 illustrates an example of a wireless communications system 100 that supports coordinated resource partitioning in accordance with aspects of the present disclosure. The wireless communications system 100 includes base stations 105, user equipments (UEs) 115, and a core network 130. In some examples, the wireless communications system 100 operates over a shared spectrum. The shared spectrum may be unlicensed or partially licensed to one or more network operators. Access to the spectrum may be limited and may be controlled by a separate coordination entity. In some examples, the wireless communications system 100 may be a Long Term Evolution (LTE) or LTE-Advanced network. In yet other examples, the wireless communications system 100 may be a millimeter wave (mmW) system, a new radio (NR) system, a 5G system, or any other successor system to LTE. The wireless communications system 100 may be operated by more than one network operator. Wireless resources may be partitioned and arbitrated among the different network operators for coordinated communication between the network operators over the wireless communications system 100.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

Base stations 105 may communicate with the core network 130 and with one another. The core network 130 may provide user authentication, access authorization, tracking, Internet Protocol (IP) connectivity, and other access, routing, or mobility functions. At least some of the base stations 105 (e.g., which may be an example of an evolved NodeB (eNB) or an access node controller (ANC)) may interface with the core network 130 through backhaul links 132 (e.g., S1, S2, etc.) and may perform radio configuration and scheduling for communication with the UEs 115. In various examples, the base stations 105 may communicate, either directly or indirectly (e.g., through core network 130), with each other over backhaul links 134 (e.g., X1, X2, etc.), which may be wired or wireless communication links.

Each base station 105 may also communicate with a number of UEs 115 through a number of other base stations 105, where base station 105 may be an example of a smart radio head. In alternative configurations, various functions of each base station 105 may be distributed across various base stations 105 (e.g., radio heads and access network controllers) or consolidated into a single base station 105.

In some cases, UE 115 and base station 105 may operate in a shared radio frequency spectrum band, which may include licensed or unlicensed frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a LBT procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Use of a medium-sensing procedure to contend for access to an unlicensed shared spectrum may result in communication inefficiencies. This may be particularly evident when multiple network operating entities (e.g., network operators) are attempting to access a shared resource. In wireless communications system 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

Accordingly, in some examples, wireless communications system 100 is operated by multiple network operating entities, and the different network operating entities may share wireless spectrum (e.g., unlicensed spectrum). In accordance with aspects of the present disclosure, the resources (e.g., time) shared between the network operating entities may be partitioned and allocated among the network operating entities to facilitate coordinated communications. For example, in wireless communications system 100, base station 105-$a$-1 may communicate with UE 115-$a$-1 may both be associated with a same network operating entity. Base station 105-$a$-2 may communicate with UE 115-$a$-2, which may similarly be associated with a different network operating entity. By time-partitioning the shared spectrum according to network operating entities, the communications between base station 105-$a$-1 and UE 115-$a$-1 and the communications between base station 105-$a$-2 and UE 115-$a$-2 may each occur during respective time intervals and may avail themselves of an entirety of a designated shared spectrum. To do so, and as more fully explained below, certain resources (e.g., time) may be partitioned and allocated to the different network operating entities for certain types of communication.

In some examples, a base station 105 or an entity of the core network 130 may act as a central arbitrator to manage access and coordinate the partitioning of resources among different network operating entities operating within the wireless communications system 100. The central arbitrator may include a spectrum access system (SAS), in some examples.

In some examples, the wireless communications system 100 may be time-synchronized. In this way, different network operating entities may each operate at different time intervals within a frame of time, with each network operating entity being time-synchronized with other network operating entities. Traditionally, a UE 115 attempting to access wireless communications system 100 may perform an initial cell search by detecting a primary synchronization signal (PSS) from a base station 105. The PSS may enable synchronization of slot timing and may indicate a physical layer identity value. The UE 115 may then receive an secondary synchronization signal (SSS). The SSS may enable radio frame synchronization, and may provide a cell identity value, which may be combined with the physical layer identity value to identify the cell. The SSS may also enable detection of a duplexing mode and a cyclic prefix length. Some systems, such as time division duplexing (TDD) systems, may transmit an SSS but not a PSS. Both the PSS and the SSS may be located in a central portion of a carrier, respectively. After receiving the PSS and SSS, the UE 115 may receive a master information block (MIB), which may be transmitted in the physical broadcast channel (PBCH). The MIB may contain system bandwidth information, a system frame number (SFN), and a Physical Hybrid-ARQ Indicator Channel (PHICH) configuration. After decoding the MIB, the UE 115 may receive one or more system information blocks (SIBs). For example, SIB1 may contain cell access parameters and scheduling information for other SIBs. Decoding SIB1 may enable the UE 115 to receive SIB2. SIB2 may contain radio resource control (RRC) configuration information related to random access channel (RACH) procedures, paging, physical uplink control channel (PUCCH), physical uplink shared channel (PUSCH), power control, sounding reference signal (SRS), and cell barring.

Figure 2:
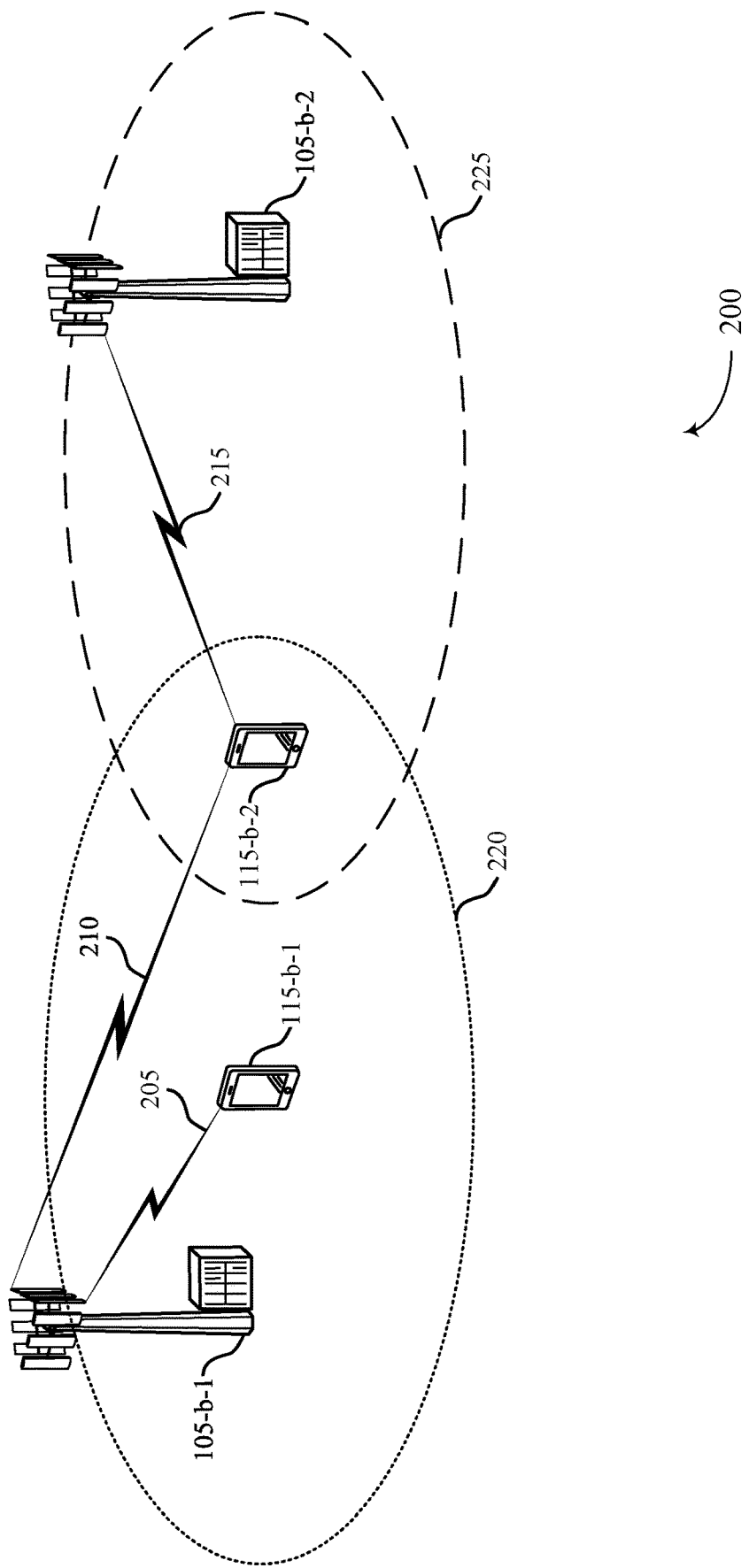
FIG. 2 illustrates an example of a system for wireless communication that supports coordinated resource partitioning in accordance with aspects of the present disclosure.

FIG. 2 illustrates an example of a wireless communications system 200 that supports coordinated resource partitioning, in accordance with aspects of the present disclosure. Wireless communications system 200 may include a base station 105-$b$-1, a base station 105-$b$-2, a UE 115-$b$-1, and a UE 115-$b$-2, which may be examples of the corresponding devices described with reference to FIG. 1. Base station 105-$b$-1 and base station 105-$b$-2 may communicate with UEs 115 or other wireless devices within their respective coverage areas 220 and 225. In some examples, wireless communications system 200 is operated by multiple network operating entities (e.g., network operators), and the different network operating entities may share wireless spectrum (e.g., unlicensed spectrum). In accordance with aspects of the present disclosure, the resources (e.g., time) shared between the network operating entities may be partitioned and allocated among the network operating entities to facilitate coordinated communications.

Base station 105-$b$-1 may be operated by one or more network operating entities. For example, base station 105-$b$-1 may be operated by a first network operating entity to communicate with UE 115-$b$-1 via communication link 205, and base station 105-$b$-1 may be operated by a second network operating entity to communicate with UE 115-$b$-2 via communication link 210. As described in more detail below, the coordination at base station 105-$b$-1 of communications between UE 115-$b$-1 and UE 115-$b$-2 may be based on a partitioned and allocated time scale between the first and second network operators.

Base station 105-$b$-2 may also be operated by one or more network operating entities. In some examples, base station 105-$b$-2 is operated by a third network operating entity to communicate with UE 115-$b$-2 via communication link 215. In this example, UE 115-$b$-2 may be configured to operate with both the second and third network operating entities.

The coordination at UE **115-*b*-2 of communications between base station 105-*b*-1 and base station 105-*b*-2** may be based on a partitioned and allocated time scale between the second and third network operators.

The shared spectrum used by wireless communications system 200 may be efficiently used by employing a coordinated resource partitioning scheme between the multiple network operating entities. For example, the shared spectrum may be partitioned by classifying time resources into intervals and assigning the intervals to different network operating entities. In some examples, certain time intervals may be allocated for exclusive use by a particular network operating entity. Other time intervals may be allocated for prioritized use by a particular network operating entity, but may also be for opportunistic use by the other network operating entities. In yet other examples, certain time intervals may be designated for opportunistic use by all network operating entities.

Access to the wireless communications system 200, the portioning and allocation of the resources, and/or the synchronization of the network operating entities may be controlled by a central coordinator (e.g., SAS). In some examples, the partition and classification of resources may be autonomously determined based on the number of network operating entities. Synchronization between the network operating entities may occur explicitly through centralized signaling. Additionally or alternatively, the entities may employ a self-synchronization scheme based on "network-listening" where the wireless nodes (e.g., base stations 105) from different network operating entities listen to each other and determine a timing synchronization accordingly.

Figure 3:
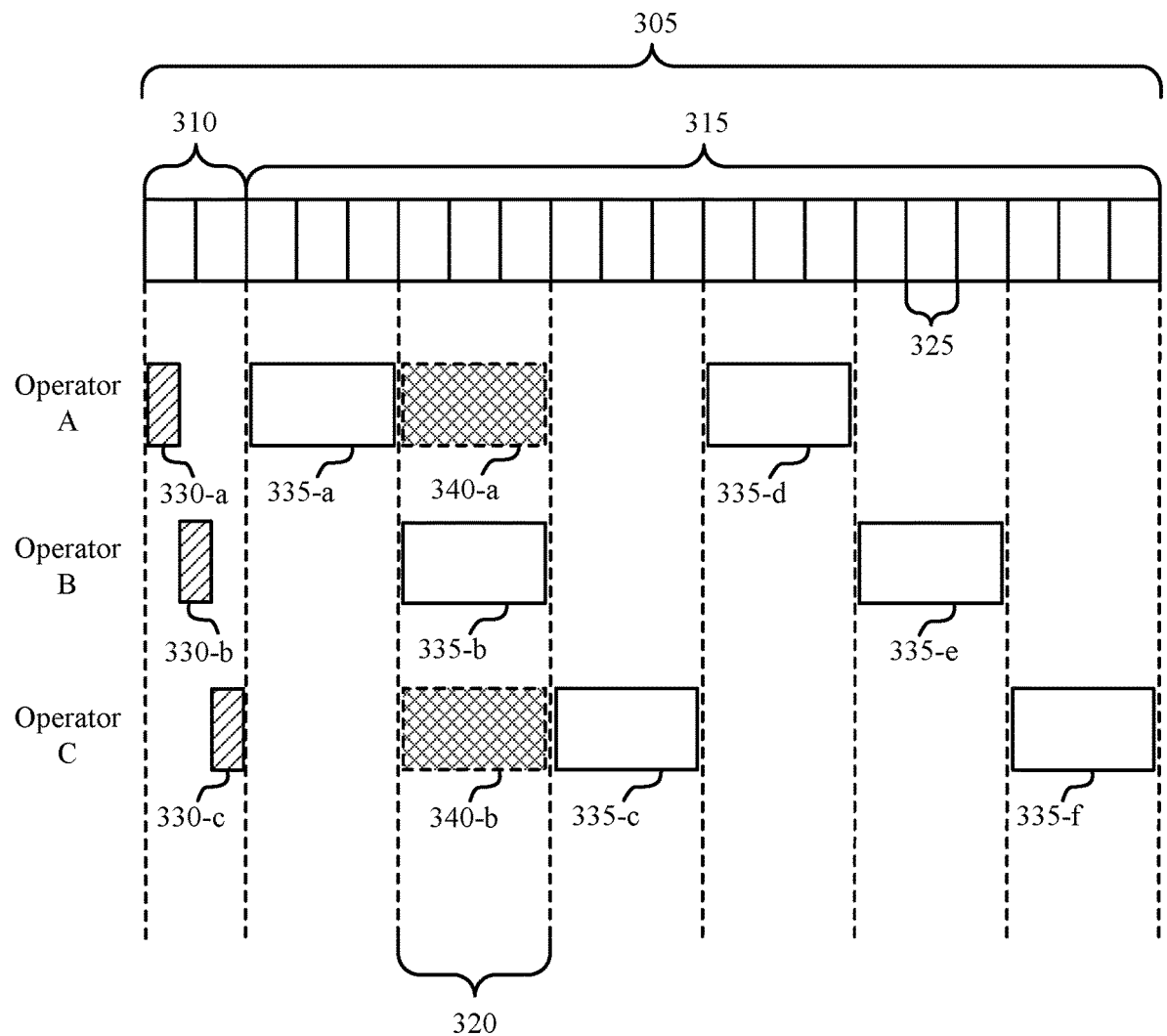
FIG. 3 illustrates an example of a timing diagram that supports coordinated resource partitioning in accordance with aspects of the present disclosure.

FIG. 3 illustrates an example of a timing diagram 300 for coordinated resource partitioning, in accordance with aspects of the present disclosure. The timing diagram 300 includes a superframe 305, which may represent a fixed duration of time (e.g., 20 ms). Superframe 305 may be repeated for a given communication session and may be used by a wireless system such as wireless communications systems 100 and 200 described with reference to FIGS. 1-2. The superframe 305 may be divided into intervals such as an acquisition interval (A-INT) 310 and an arbitration interval 315. As described in more detail below, the A-INT 310 and arbitration interval 315 may be subdivided into sub-intervals, designated for certain resource types, and allocated to different network operating entities to facilitate coordinated communications between the different network operating entities. For example, the arbitration interval 315 may be divided into a plurality of sub-intervals 320. Also, the superframe 305 may be further divided into a plurality of subframes 325 with a fixed duration (e.g., 1 ms). While timing diagram 300 illustrates three different network operating entities (e.g., Operator A, Operator B, Operator C), the number of network operating entities using the superframe 305 for coordinated communications may be greater than or fewer than the number illustrated in timing diagram 300.

The A-INT 310 may be a dedicated interval of the superframe 305 that is reserved for exclusive communications by the network operating entities. In some examples, each network operating entity may be allocated certain resources within the A-INT 310 for exclusive communications. For example, resources **330-*a* may be reserved for exclusive communications by Operator A, resources 330-*b* may be reserved for exclusive communications by Operator B, and resources 330-*c* may be reserved for exclusive communications by Operator C. Since the resources 330-*a* are reserved for exclusive communications by Operator A, neither Operator B nor Operator C can communicate during resources 330-*a*, even if Operator A chooses not to communicate during those resources. That is, access to exclusive resources is limited to the designated network operator. Similar restrictions apply to resources 330-*b* for Operator B and resources 330-*c* for Operator C. The wireless nodes of Operator A (e.g., UEs 115 or base stations 105) may communicate any information desired during their exclusive resources 330-*a***, such as control information or data.

When communicating over an exclusive resource, a network operating entity does not need to perform any medium sensing procedures (e.g., LBT) or clear channel assessment (CCA)) because the network operating entity knows that the resources are reserved. Because only the designated network operating entity may communicate over exclusive resources, there may be a reduced likelihood of interfering communications as compared to relying on medium sensing techniques alone (e.g., no hidden node problem). In some examples, the A-INT 310 is used to transmit control information, such as synchronization signals ("SYNC" signals), system information (e.g., system information blocks (SIBs)), paging information (e.g., PBCH messages), or random access information (e.g., RACH signals). In some examples, all of the wireless nodes associated with a network operating entity may transmit at the same time during their exclusive resources.

In some examples, resources may be classified as prioritized for certain network operating entities. Resources that are assigned with priority for a certain network operating entity may be referred to as a guaranteed interval (G-INT) for that network operating entity. The interval of resources used by the network operating entity during the G-INT may be referred to as a prioritized sub-interval. For example, resources **335-*a* may be prioritized for use by Operator A and may therefore be referred to as a G-INT for Operator A (e.g., G-INT-OpA). Similarly, resources 335-*b* may be prioritized for Operator B, resources 335-*c* may be prioritized for Operator C, resources 335-*d* may be prioritized for Operator A, resources 335-*e* may be prioritized for Operator B, and resources 335-*f*** may be prioritized for operator C.

The various G-INT resources illustrated in FIG. 3 appear to be staggered to illustrate their association with their respective network operating entities, but these resources may all be on the same frequency bandwidth. Thus, if viewed along a time-frequency grid, the G-INT resources may appear as a contiguous line within the superframe 305. This partitioning of data may be an example of time division multiplexing (TDM). Also, when resources appear in the same sub-interval (e.g., resources **340-*a* and resources 335-*b*), these resources represent the same time resources with respect to the superframe 305 (e.g., the resources occupy the same sub-interval 320**), but the resources are separately designated to illustrate that the same time resources can be classified differently for different operators.

When resources are assigned with priority for a certain network operating entity (e.g., a G-INT), that network operating entity may communicate using those resources without having to wait or perform any medium sensing procedures (e.g., LBT or CCA). For example, the wireless nodes of Operator A are free to communicate any data or control information during resources **335-*a*** without interference from the wireless nodes of Operator B or Operator C.

An network operating entity may additionally signal to another operator that it intends to use a particular G-INT. For example, referring to resources **335-*a*, Operator A may signal to Operator B and Operator C that it intends to use resources 335-*a***. Such signaling may be referred to as an activity indication. Moreover, since Operator A has priority over resources 335-*a*, Operator A may be considered as a higher priority operator than both Operator B and Operator C. However, as discussed above, Operator A does not have to send signaling to the other network operating entities to ensure interference-free transmission during resources 335-*a* because the resources 335-*a* are assigned with priority to Operator A.

Similarly, a network operating entity may signal to another network operating entity that it intends not to use a particular G-INT. This signaling may also be referred to as an activity indication. For example, referring to resources 335-*b*, Operator B may signal to Operator A and Operator C that it intends not to use the resources 335-*b* for communication, even though the resources are assigned with priority to Operator B. With reference to resources 335-*b*, Operator B may be considered a higher priority network operating entity than Operator A and Operator C. In such cases, Operators A and C may attempt to use resources of sub-interval 320 on an opportunistic basis. Thus, from the perspective of Operator A, the sub-interval 320 that contains resources 335-*b* may be considered an opportunistic interval (O-INT) for Operator A (e.g., O-INT-OpA). For illustrative purposes, resources 340-*a* may represent the O-INT for Operator A. Also, from the perspective of Operator C, the same sub-interval 320 may represent an O-INT for Operator C with corresponding resources 340-*b*. Resources 340-*a*, 335-*b*, and 340-*b* all represent the same time resources (e.g., a particular sub-interval 320), but are identified separately to signify that the same resources may be considered as a G-INT for some network operating entities and yet as an O-INT for others.

To utilize resources on an opportunistic basis, Operator A and Operator C may perform medium-sensing procedures to check for communications on a particular channel before transmitting data. For example, if Operator B decides not to use resources 335-*b* (e.g., G-INT-OpB), then Operator A may use those same resources (e.g., represented by resources 340-*a*) by first checking the channel for interference (e.g., LBT) and then transmitting data if the channel was determined to be clear. Similarly, if Operator C wanted to access resources on an opportunistic basis during sub-interval 320 (e.g., use an O-INT represented by resources 340-*b*) in response to an indication that Operator B was not going to use its G-INT, Operator C may perform a medium sensing procedure and access the resources if available. In some cases, two operators (e.g., Operator A and Operator C) may attempt to access the same resources, in which case the operators may employ contention-based procedures to avoid interfering communications. The operators may also have sub-priorities assigned to them designed to determine which operator may gain access to resources if more than operator is attempting access simultaneously.

In some examples, a network operating entity may intend not to use a particular G-INT assigned to it, but may not send out an activity indication that conveys the intent not to use the resources. In such cases, for a particular sub-interval 320, lower priority operating entities may be configured to monitor the channel to determine whether a higher priority operating entity is using the resources. If a lower priority operating entity determines through LBT or similar method that a higher priority operating entity is not going to use its G-INT resources, then the lower priority operating entities may attempt to access the resources on an opportunistic basis as described above.

In some examples, access to a G-INT or O-INT may be preceded by a reservation signal (e.g., request-to-send (RTS)/clear-to-send (CTS)), and the contention window (CW) may be randomly chosen between one and the total number of operating entities.

In some examples, an operating entity may employ or be compatible with coordinated multipoint (CoMP) communications. For example an operating entity may employ CoMP and dynamic time division duplex (TDD) in a G-INT and opportunistic CoMP in an O-INT as needed.

In the example illustrated in FIG. 3, each sub-interval 320 includes a G-INT for one of Operator A, B, or C. However, in some cases, one or more sub-intervals 320 may include resources that are neither reserved for exclusive use nor reserved for prioritized use (e.g., unassigned resources). Such unassigned resources may be considered an O-INT for any network operating entity, and may be accessed on an opportunistic basis as described above.

In some examples, each subframe 325 may contain 14 symbols (e.g., 250-μs for 60 kHz tone spacing). These subframes 325 may be standalone, self-contained Interval-Cs (ITCs) or the subframes 325 may be a part of a long ITC. An ITC may be a self-contained transmission starting with a downlink transmission and ending with a uplink transmission. In some examples, an ITC may contain one or more subframes 325 operating contiguously upon medium occupation. In some cases, there may be a maximum of eight network operators in an A-INT 310 (e.g., with duration of 2 ms) assuming a 250-μs transmission opportunity.

Although three operators are illustrated in FIG. 3, it should be understood that more or less network operating entities may be configured to operate in a coordinated manner as described above. In some cases, the location of the G-INT, O-INT, or A-INT within superframe 305 for each operator is determined autonomously based on the number of network operating entities active in a system. For example, if there is only one network operating entity, each sub-interval 320 may be occupied by a G-INT for that single network operating entity, or the sub-intervals 320 may alternate between G-INTs for that network operating entity and O-INTs to allow other network operating entities to enter. If there are two network operating entities, the sub-intervals 320 may alternate between G-INTs for the first network operating entity and G-INTs for the second network operating entity. If there are three network operating entities, the G-INT and O-INTs for each network operating entity may be designed as illustrated in FIG. 3. If there are four network operating entities, the first four sub-intervals 320 may include consecutive G-INTs for the four network operating entities and the remaining two sub-intervals 320 may contain O-INTs. Similarly, if there are five network operating entities, the first five sub-intervals 320 may contain consecutive G-INTs for the five network operating entities and the remaining sub-interval 320 may contain an O-INT. If there are six network operating entities, all six sub-intervals 320 may include consecutive G-INTs for each network operating entity. It should be understood that these examples are for illustrative purposes only and that other autonomously determined interval allocations may be used.

It should be understood that the coordination framework described with reference to FIG. 3 is for illustration purposes only. For example, the duration of superframe 305 may be more or less than 20 ms. Also, the number, duration, and location of sub-intervals 320 and subframes 325 may differ from the configuration illustrated. Also, the types of resource designations (e.g., exclusive, prioritized, unassigned) may differ or include more or less sub-designations.

Figure 4:
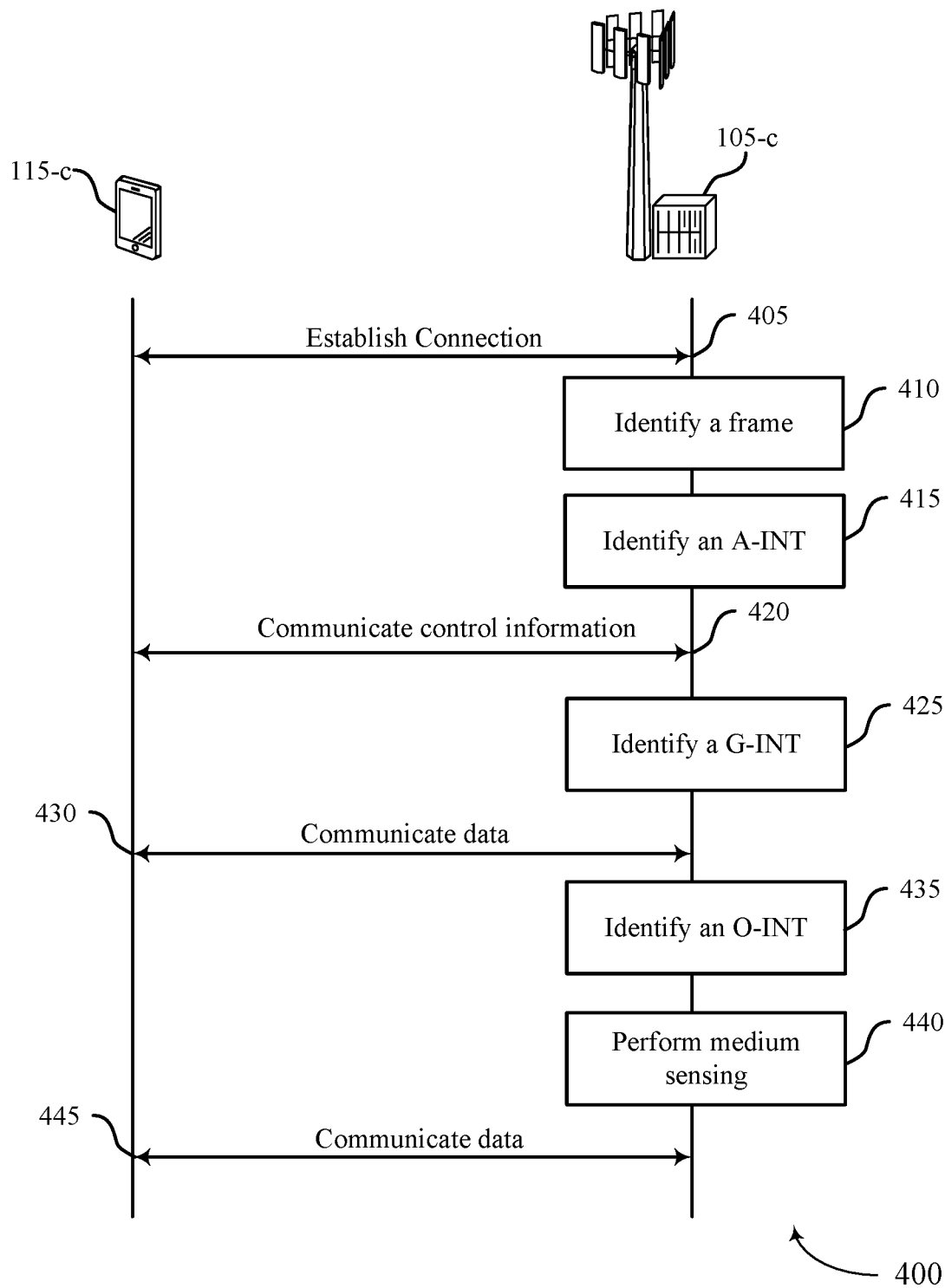
FIG. 4 illustrates an example of a process flow that supports coordinated resource partitioning in accordance with aspects of the present disclosure.

FIG. 4 illustrates an example of a flow diagram 400 between a UE 115-*c* and a base station 105-*c* supporting coordinated resource partitioning in accordance with aspects of the present disclosure. UE 115-c and base station 105-b may be examples of the corresponding entities described with reference to FIGS. 1-3.

At step 405, a wireless connection may be established between UE 115-c and base station 105-c. Base station 105-c and UE 115-c may be operated by a common network operating entity. The wireless connection may include or be preceded by the exchange of control signaling such as access or synchronization signaling.

At step 410, the base station 105-c may identify a frame in a shared frequency spectrum band shared by other network operating entities. The frame may be a superframe 305 as described with reference to FIG. 3. In some examples, the UE 115-c may identify the frame.

At step 415, the base station 105-c may identify a first plurality of sub-intervals in the frame that are for exclusive use by the network operating entity. For example, the first plurality of sub-intervals may include one or more sub-intervals within an A-INT of a superframe 305 as described with reference to FIG. 3. In some examples, the base station 105-c may identify a single sub-interval within a frame reserved for exclusive use by the network operating entity. Additionally or alternatively, the UE 115-c identify the first plurality of sub-intervals.

At step 420, the base station 105-c may communicate control information during the sub-intervals within the A-INT to the UE 115-c. The control information may include synchronization information, system information, paging information, random access information, or a combination thereof. In some examples, the UE 115-c may communicate control information to the base station 105-c.

At step 425, the base station 105-c may identify a second plurality of sub-intervals in the frame for prioritized use by the network operating entity. The second plurality of sub-intervals may include one or more G-INTs as described with reference to FIG. 3.

At step 430, the base station 105-c may communicate data with the UE 115-c during the G-INT. In some other cases, the base station 105-c may communicate control information, paging information, or both with the UE 115-c during the G-INT.

In some cases, during a G-INT, the base station 105-c may indicate to a lower priority network operating entity that communication with the UE 115-c will or will not occur during the G-INT, the lower priority network operating entity having a lower communication priority during the G-INT. In such cases, the lower priority network operating entity may access the G-INT on an opportunistic basis.

At step 435, the base station 105-c may identify a third plurality of sub-intervals in the frame for opportunistic use by the network operating entity. The sub-intervals may include one or more O-INTs as described with reference to FIG. 3.

At step 440, the base station 105-c may perform medium sensing procedures for measuring communications from other network operating entities during the O-INT. The measuring communications may include an LBT procedure.

In some cases, at step 445, by determining an absence of communications from the other network operating entities during the O-INT, the base station 105-c may communicate data with the UE 115-c.

In some cases, the location of the A-INT, G-INT, or O-INT within the identified frame may be determined by a network operating entity coordinator (e.g., a SAS).

Figure 5:
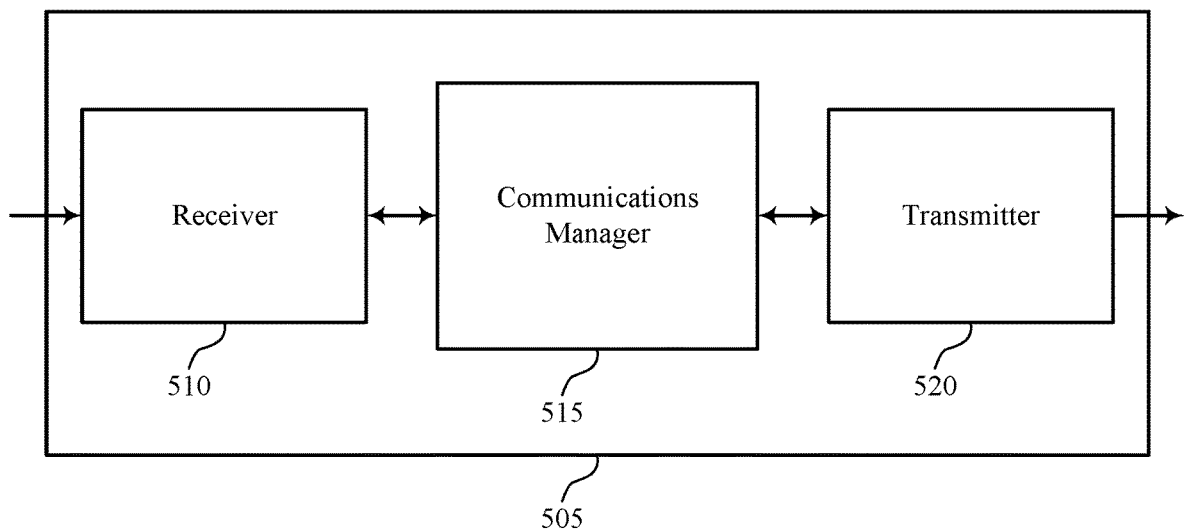
FIGS. 5 through 7 show block diagrams of a device that supports coordinated resource partitioning in accordance with aspects of the present disclosure.

FIG. 5 shows a block diagram 500 of a wireless device 505 that supports coordinated resource partitioning in accordance with aspects of the present disclosure. Wireless device 505 may be an example of aspects of a user equipment (UE) 115 or base station 105 as described with reference to FIG. 1. Wireless device 505 may include receiver 510, communications manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to coordinated resource partitioning, etc.). Information may be passed on to other components of the device. The receiver 510 may be an example of aspects of the transceiver 835 described with reference to FIG. 8.

Communications manager 515 may be an example of aspects of the communications manager 815 described with reference to FIG. 8.

Communications manager 515 may identify a frame in a shared radio frequency spectrum band shared by a set of network operating entities, identify a first set of sub-intervals in the frame for exclusive use by a network operating entity, identify a second set of sub-intervals in the frame for prioritized use by the network operating entity, identify a third set of sub-intervals in the frame for opportunistic use by the network operating entity, and communicate, using one of the identified sub-intervals, with a wireless node associated with the network operating entity.

Transmitter 520 may transmit signals generated by other components of the device. In some examples, the transmitter 520 may be collocated with a receiver 510 in a transceiver module. For example, the transmitter 520 may be an example of aspects of the transceiver 835 described with reference to FIG. 8. The transmitter 520 may include a single antenna, or it may include a set of antennas.

Figure 6:
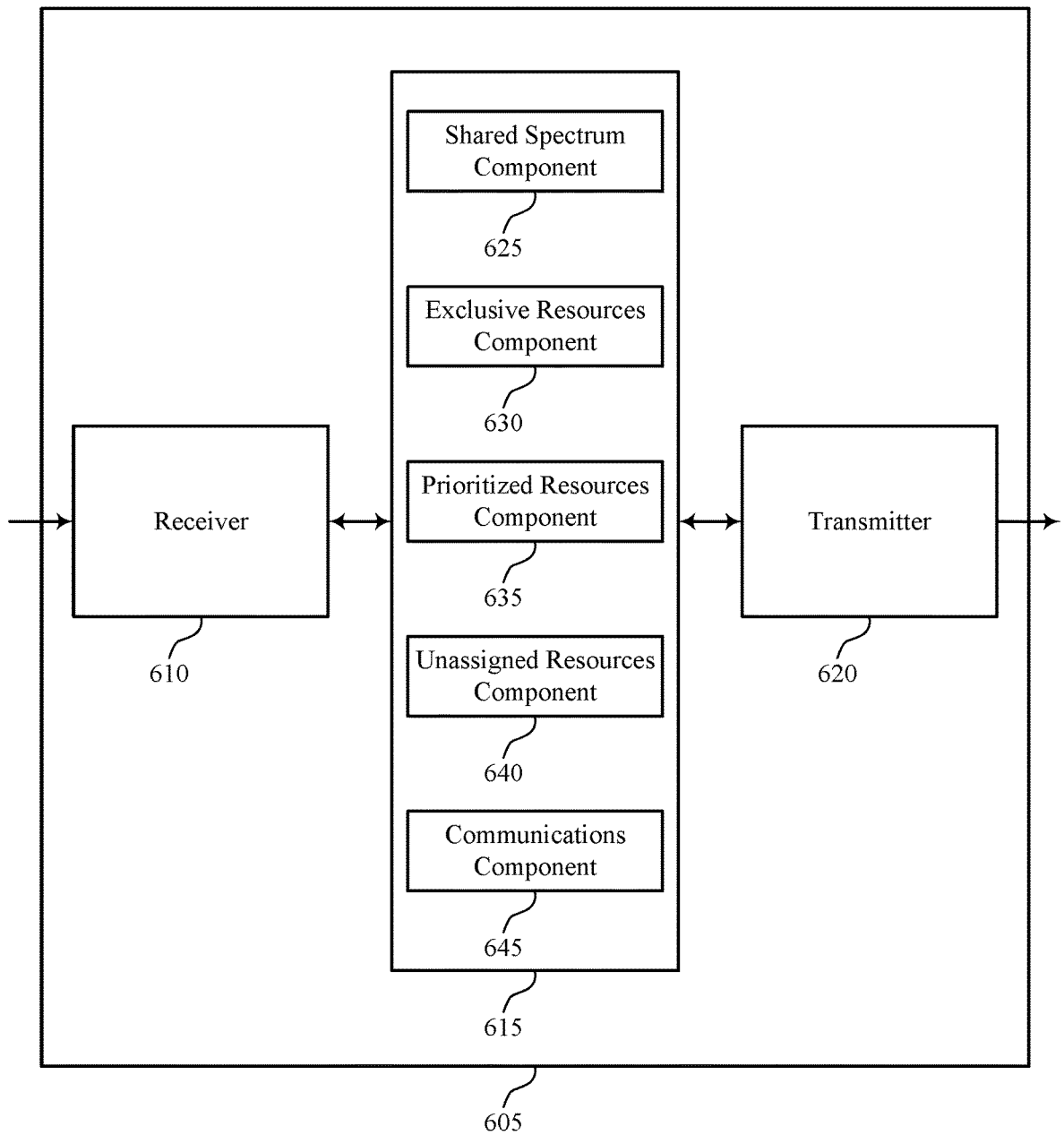

FIG. 6 shows a block diagram 600 of a wireless device 605 that supports coordinated resource partitioning in accordance with aspects of the present disclosure. Wireless device 605 may be an example of aspects of a wireless device 505 or a UE 115 or base station 105 as described with reference to FIGS. 1 and 5. Wireless device 605 may include receiver 610, communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to coordinated resource partitioning, etc.). Information may be passed on to other components of the device. The receiver 610 may be an example of aspects of the transceiver 835 described with reference to FIG. 8.

Communications manager 615 may be an example of aspects of the communications manager 815 described with reference to FIG. 8.

Communications manager 615 may also include shared spectrum component 625, exclusive resources component 630, prioritized resources component 635, unassigned resources component 640, and communications component 645.

Shared spectrum component 625 may identify a frame in a shared radio frequency spectrum band shared by a set of network operating entities.

Exclusive resources component 630 may identify a first set of sub-intervals in the frame for exclusive use by a network operating entity and communicate control information with the wireless node during at least one of the first set of sub-intervals. In some cases, the control information includes synchronization information, system information, paging information, random access information, or a combination thereof.

Prioritized resources component 635 may identify a second set of sub-intervals in the frame for prioritized use by the network operating entity, communicate data with the wireless node during at least one of the second set of sub-intervals, communicate control information, paging information, or both with the wireless node during the at least one of the second set of sub-intervals. In some cases, the prioritized resources component 635 may indicate to a lower priority network operating entity that communication with the wireless node will occur during the at least one of the second set of sub-intervals, the lower priority network operating entity having a lower communication priority than the network operating entity during the at least one of the second set of sub-intervals.

In some other cases, the prioritized resources component 635 may indicate to a lower priority network operating entity that communication with the wireless node will not occur during at least one of the second set of sub-intervals, the lower priority network operating entity having a lower communication priority during the at least one of the second set of sub-intervals than the network operating entity.

Unassigned resources component 640 may identify a third set of sub-intervals in the frame for opportunistic use by the network operating entity.

Communications component 645 may communicate, using one of the identified sub-intervals, with a wireless node associated with the network operating entity, communicate data during the at least one of the third set of sub-intervals based on the determining, refrain from communicating data during the at least one of the third set of sub-intervals based on the determining, communicate data during the at least one of the third set of sub-intervals based on the signaling, refrain from communicating data during the at least one of the third set of sub-intervals based on the signaling, and communicate with the wireless node based on the synchronization information.

Transmitter 620 may transmit signals generated by other components of the device. In some examples, the transmitter 620 may be collocated with a receiver 610 in a transceiver module. For example, the transmitter 620 may be an example of aspects of the transceiver 835 described with reference to FIG. 8. The transmitter 620 may include a single antenna, or it may include a set of antennas.

Figure 7:
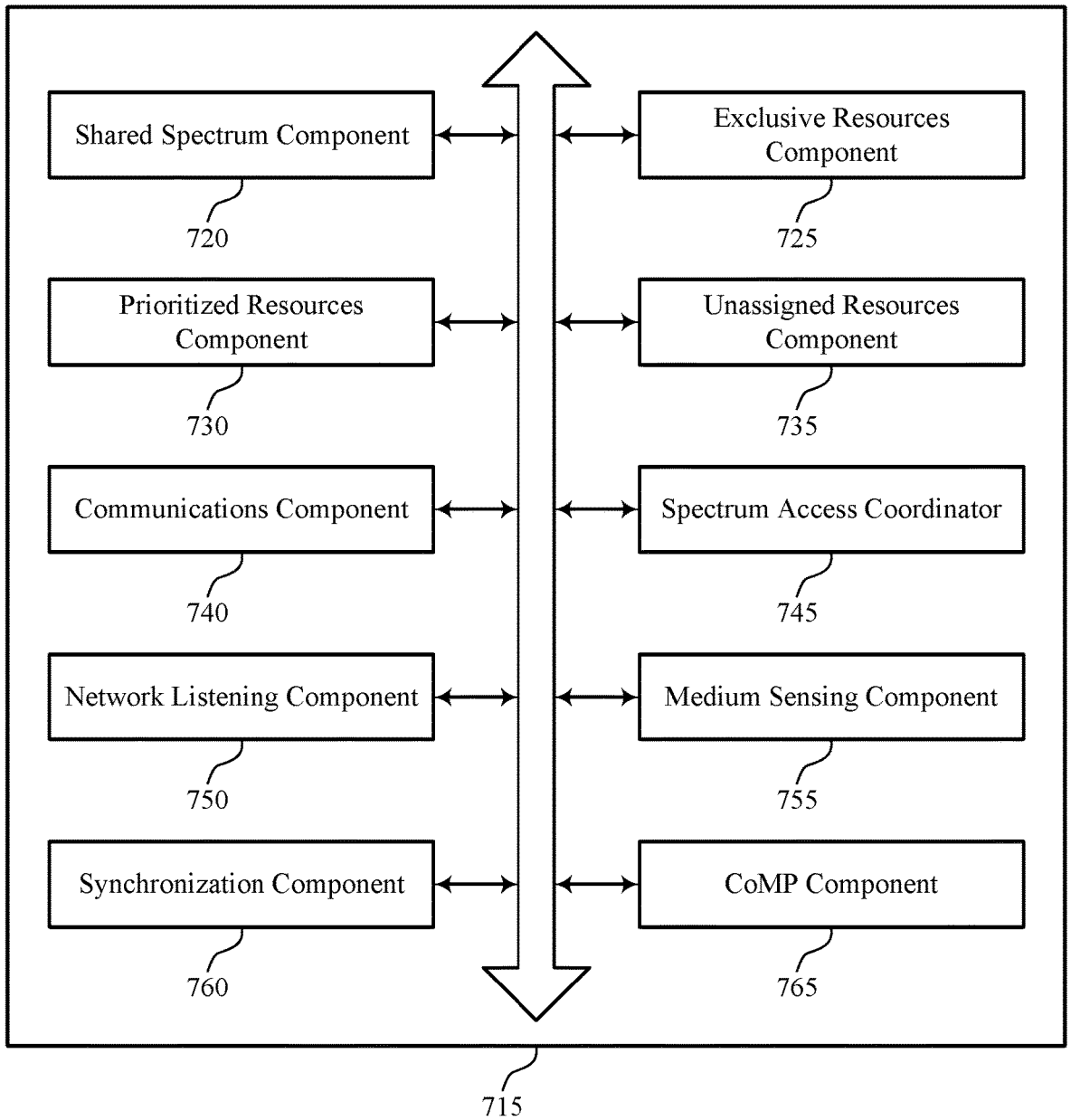

FIG. 7 shows a block diagram 700 of a communications manager 715 that supports coordinated resource partitioning in accordance with aspects of the present disclosure. The communications manager 715 may be an example of aspects of a communications manager 515, a communications manager 615, or a communications manager 815 described with reference to FIGS. 5, 6, and 8. The communications manager 715 may include shared spectrum component 720, exclusive resources component 725, prioritized resources component 730, unassigned resources component 735, communications component 740, spectrum access coordinator 745, network listening component 750, medium sensing component 755, synchronization component 760, and CoMP component 765. Each of these modules may communicate, directly or indirectly, with one another (e.g., via one or more buses).

Shared spectrum component 720 may identify a frame in a shared radio frequency spectrum band shared by a set of network operating entities.

Exclusive resources component 725 may identify a first set of sub-intervals in the frame for exclusive use by a network operating entity and communicate control information with the wireless node during at least one of the first set of sub-intervals. In some cases, the control information includes synchronization information, system information, paging information, random access information, or a combination thereof.

Prioritized resources component 730 may identify a second set of sub-intervals in the frame for prioritized use by the network operating entity, communicate data with the wireless node during at least one of the second set of sub-intervals, communicate control information, paging information, or both with the wireless node during the at least one of the second set of sub-intervals. In some cases the prioritized resources component 730 may indicate to a lower priority network operating entity that communication with the wireless node will occur during the at least one of the second set of sub-intervals, the lower priority network operating entity having a lower communication priority than the network operating entity during the at least one of the second set of sub-intervals.

In some other cases, the prioritized resources component 730 may indicate to a lower priority network operating entity that communication with the wireless node will not occur during at least one of the second set of sub-intervals, the lower priority network operating entity having a lower communication priority during the at least one of the second set of sub-intervals than the network operating entity.

Unassigned resources component 735 may identify a third set of sub-intervals in the frame for opportunistic use by the network operating entity.

Communications component 740 may communicate, using one of the identified sub-intervals, with a wireless node associated with the network operating entity, communicate data during the at least one of the third set of sub-intervals based on the determining, refrain from communicating data during the at least one of the third set of sub-intervals based on the determining, communicate data during the at least one of the third set of sub-intervals based on the signaling, refrain from communicating data during the at least one of the third set of sub-intervals based on the signaling, and communicate with the wireless node based on the synchronization information.

Spectrum access coordinator 745 may determine three sets of sub-intervals in a frame of a shared frequency spectrum band shared by a plurality of network operating entities. In some cases, a location of at least the first set of sub-intervals, the second set of sub-intervals, or the third set of sub-intervals within the frame is determined by a network operating entity coordinator. In some cases, the network operating entity coordinator includes an SAS.

Network listening component 750 may determine the number of active network operating entities. In some cases, a location of at least the first set of sub-intervals, the second set of sub-intervals, or the third set of sub-intervals within the frame is autonomously determined based on a number of the set of network operating entities.

Medium sensing component 755 may measure for communications from other network operating entities during at least one of the third set of sub-intervals, determine, based on the measuring, an absence of communications from the other network operating entities during the at least one of the third set of sub-intervals, In some other cases, medium sensing component 755 may determine based on the measuring, a presence of communications from the other network operating entities during the at least one of the third set of sub-intervals, and identify, during at least one of the third set of sub-intervals, signaling from a higher priority network operating entity. In some cases, the signaling may indicate that the higher priority network operating entity will not communicate during the at least one of the third set of sub-intervals, the higher priority network operating entity having a higher communication priority during the at least one of the third set of sub-intervals than the network operating entity.

In some other cases, the signaling may indicate that the higher priority network operating entity will communicate during the at least one of the third set of sub-intervals, the higher priority network operating entity having a higher communication priority during the at least one of the third set of sub-intervals than the network operating entity. In some cases, the measuring for communications includes an LBT procedure.

Synchronization component 760 may receive synchronization information from an additional wireless node associated with another network operating entity.

CoMP component 765 may communicate with the wireless node using coordinated multi-point communication.

Figure 8:
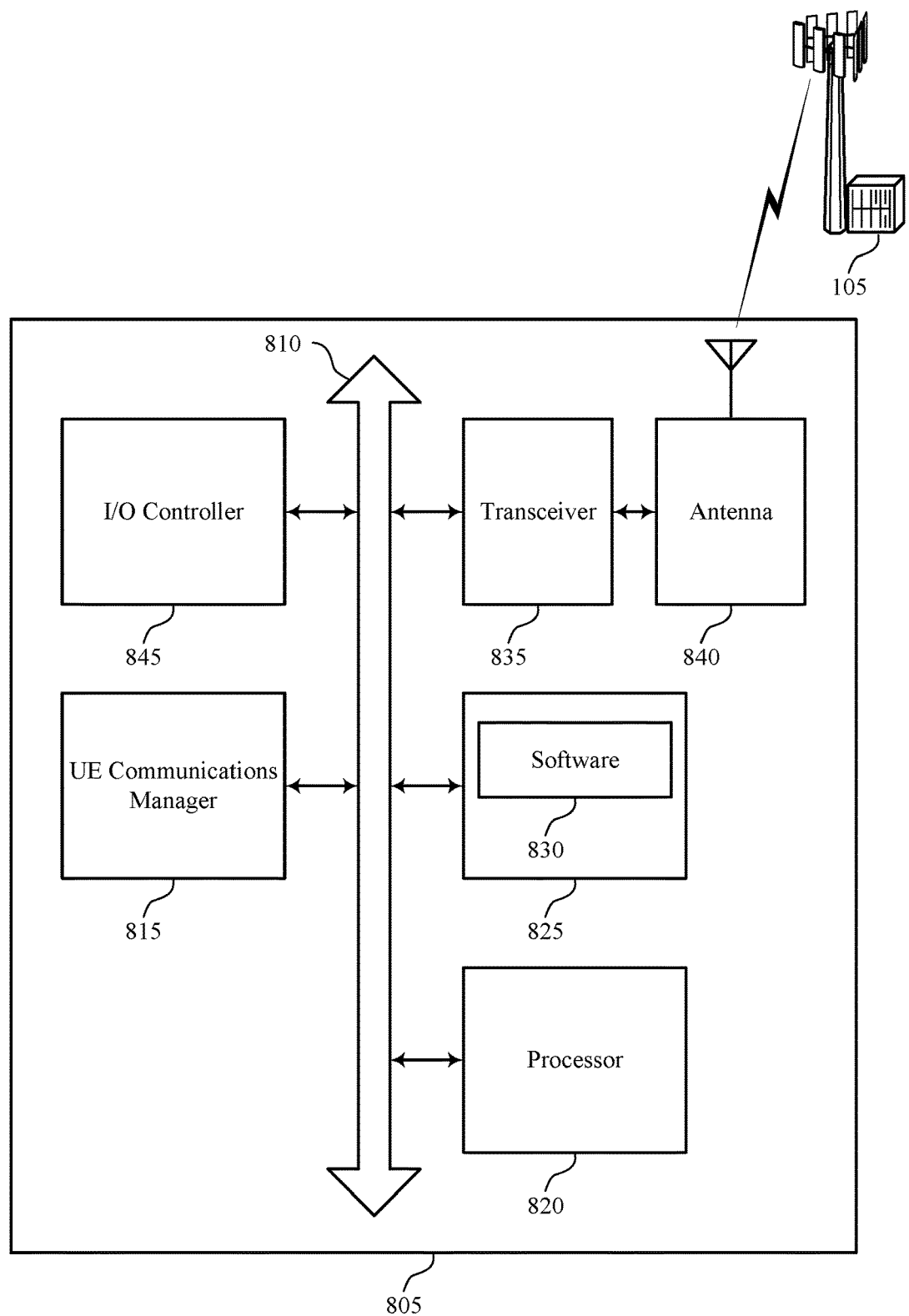
FIG. 8 illustrates a block diagram of a system including a user equipment (UE) that supports coordinated resource partitioning in accordance with aspects of the present disclosure.

FIG. 8 shows a diagram of a system 800 including a device 805 that supports coordinated resource partitioning in accordance with aspects of the present disclosure. Device 805 may be an example of or include the components of wireless device 505, wireless device 605, or a UE 115 as described above, e.g., with reference to FIGS. 1, 5 and 6. Device 805 may include components for bi-directional voice and data communications including components for transmitting and receiving communications, including UE communications manager 815, processor 820, memory 825, software 830, transceiver 835, antenna 840, and I/O controller 845. These components may communicate electronically via one or more busses (e.g., bus 810). Device 805 may communicate wirelessly with one or more base stations 105.

Processor 820 may include an intelligent hardware device, (e.g., a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting coordinated resource partitioning).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware and/or software operation such as the interaction with peripheral components or devices.

Software 830 may include code to implement aspects of the present disclosure, including code to support coordinated resource partitioning. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described above. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas.

In some cases, the wireless device may include a single antenna 840. However, in some cases the device may have more than one antenna 840, which may be capable of concurrently transmitting or receiving multiple wireless transmissions.

I/O controller 845 may manage input and output signals for device 805. I/O controller 845 may also manage peripherals not integrated into device 805. In some cases, I/O controller 845 may represent a physical connection or port to an external peripheral. In some cases, I/O controller 845 may utilize an operating system such as iOS®, ANDROID®, MS-DOS®, MS-WINDOWS®, OS/2®, UNIX®, LINUX®, or another known operating system.

Figure 9:
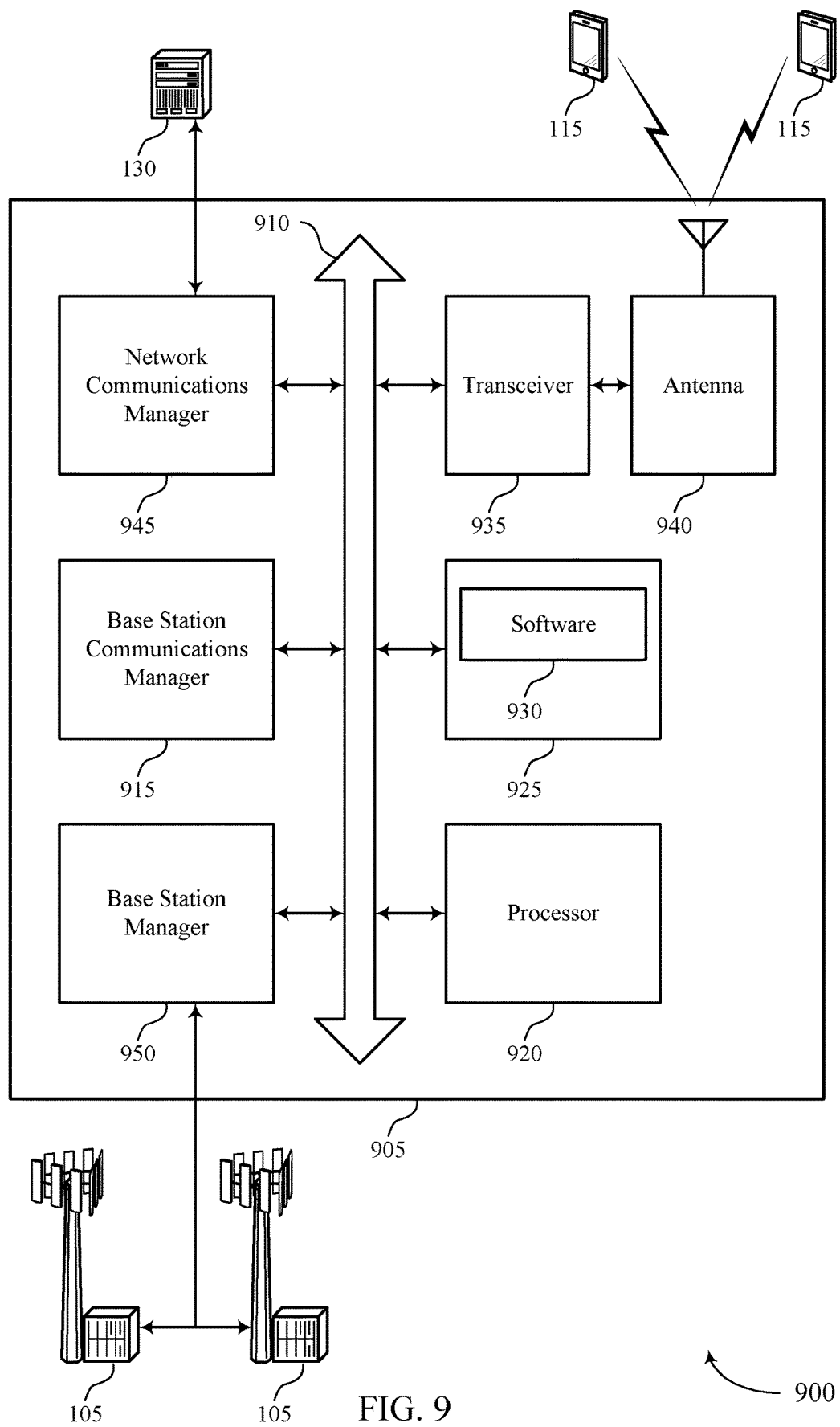
FIG. 9 illustrates a block diagram of a system including a base station that supports coordinated resource partitioning in accordance with aspects of the present disclosure.

FIG. 9 shows a diagram of a system 900 including a device 905 that supports coordinated resource partitioning in accordance with aspects of the present disclosure. Device 905 may be an example of or include the components of wireless device 605, wireless device 705, or a base station 105 as described above, e.g., with reference to FIGS. 1, 6 and 7. Device 905 may include components for bi-directional voice and data communications including components for transmitting and receiving communications, including base station communications manager 915, processor 920, memory 925, software 930, transceiver 935, antenna 940, network communications manager 945, and base station manager 950. These components may be in electronic communication via one or more busses (e.g., bus 910). Device 905 may communicate wirelessly with one or more UEs 115.

Processor 920 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting coordinated resource partitioning).

Memory 925 may include RAM and ROM. The memory 925 may store computer-readable, computer-executable software 930 including instructions that, when executed, cause the processor to perform various functions described herein. In some cases, the memory 925 may contain, among other things, a BIOS which may control basic hardware and/or software operation such as the interaction with peripheral components or devices.

Software 930 may include code to implement aspects of the present disclosure, including code to support coordinated resource partitioning. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some cases, the wireless device may include a single antenna 940. However, in some cases the device may have more than one antenna 940, which may be capable of concurrently transmitting or receiving multiple wireless transmissions.

Network communications manager 945 may manage communications with the core network (e.g., via one or more wired backhaul links). For example, the network communications manager 945 may manage the transfer of data communications for client devices, such as one or more UEs 115.

Base station manager 950 may manage communications with other base stations 105, and may include a controller or scheduler for controlling communications with UEs 115 in cooperation with other base stations 105. For example, the base station manager 950 may coordinate scheduling for transmissions to UEs 115 for various interference mitigation techniques such as beamforming or joint transmission. In some examples, base station manager 950 may provide an X2 interface within an LTE/LTE-A wireless communication network technology to provide communication between base stations 105. Base station manager 950 may provide other interfaces compatible with NR or other next-generation wireless communication network technology.

Figure 10:
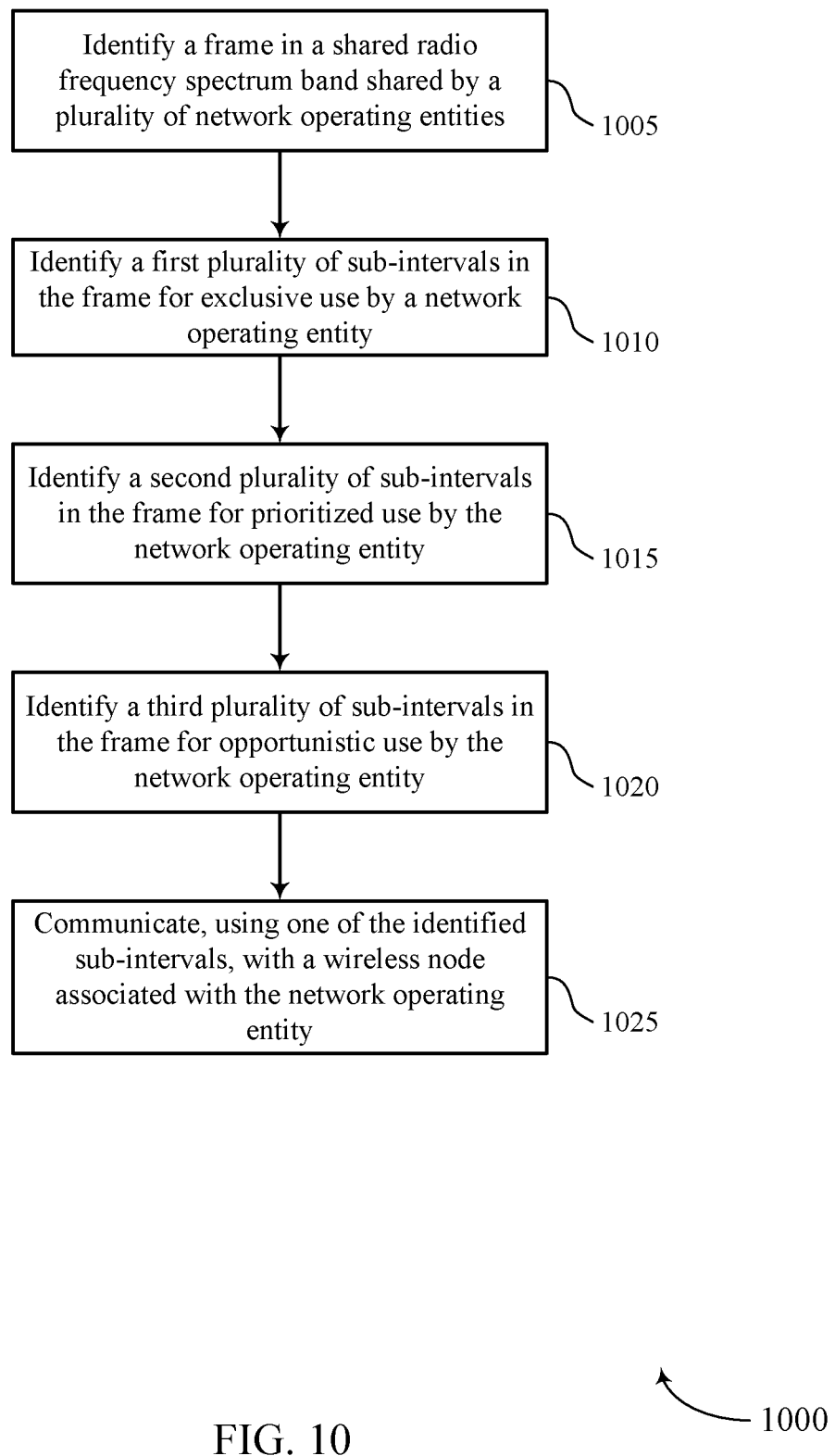
FIGS. 10 through 15 illustrate methods for coordinated resource partitioning in accordance with aspects of the present disclosure.

FIG. 10 shows a flowchart illustrating a method 1000 for coordinated resource partitioning in accordance with aspects of the present disclosure. The operations of method 1000 may be implemented by a UE 115 or base station 105 or its components as described herein. For example, the operations of method 1000 may be performed by a communications manager as described with reference to FIGS. 5 through 7. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At block 1005 the UE 115 or base station 105 may identify a frame in a shared radio frequency spectrum band shared by a plurality of network operating entities. The operations of block 1005 may be performed according to the methods described with reference to FIGS. 1 through 4. In some examples, aspects of the operations of block 1005 may be performed by a shared spectrum component as described with reference to FIGS. 5 through 7.

At block 1010 the UE 115 or base station 105 may identify a first plurality of sub-intervals in the frame for exclusive use by a network operating entity. The operations of block 1010 may be performed according to the methods described with reference to FIGS. 1 through 4. In some examples, aspects of the operations of block 1010 may be performed by an exclusive resources component as described with reference to FIGS. 5 through 7.

At block 1015 the UE 115 or base station 105 may identify a second plurality of sub-intervals in the frame for prioritized use by the network operating entity. The operations of block 1015 may be performed according to the methods described with reference to FIGS. 1 through 4. In some examples, aspects of the operations of block 1015 may be performed by a prioritized resources component as described with reference to FIGS. 5 through 7.

At block 1020 the UE 115 or base station 105 may identify a third plurality of sub-intervals in the frame for opportunistic use by the network operating entity. The operations of block 1020 may be performed according to the methods described with reference to FIGS. 1 through 4. In some examples, aspects of the operations of block 1020 may be performed by an unassigned resources component as described with reference to FIGS. 5 through 7.

At block 1025 the UE 115 or base station 105 may communicate, using one of the identified sub-intervals, with a wireless node associated with the network operating entity. The operations of block 1025 may be performed according to the methods described with reference to FIGS. 1 through 4. In some examples, aspects of the operations of block 1025 may be performed by a communications component as described with reference to FIGS. 5 through 7.

Figure 11:
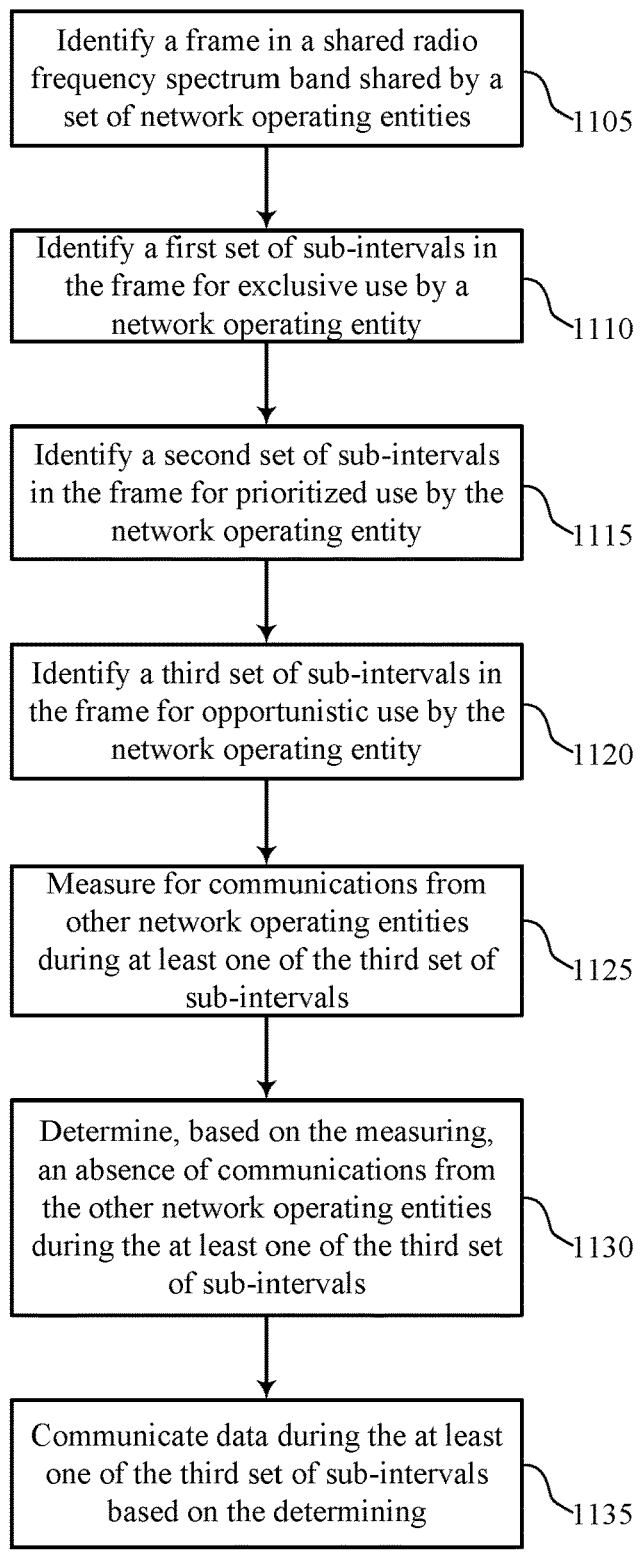

FIG. 11 shows a flowchart illustrating a method 1100 for coordinated resource partitioning in accordance with aspects of the present disclosure. The operations of method 1100 may be implemented by a UE 115 or base station 105 or its components as described herein. For example, the operations of method 1100 may be performed by a communications manager as described with reference to FIGS. 5 through 7. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At block 1105 the UE 115 or base station 105 may identify a frame in a shared radio frequency spectrum band shared by a plurality of network operating entities. The operations of block 1105 may be performed according to the methods described with reference to FIGS. 1 through 4. In some examples, aspects of the operations of block 1105 may be performed by a shared spectrum component as described with reference to FIGS. 5 through 7.

At block 1110 the UE 115 or base station 105 may identify a first plurality of sub-intervals in the frame for exclusive use by a network operating entity. The operations of block 1110 may be performed according to the methods described with reference to FIGS. 1 through 4. In some examples, aspects of the operations of block 1110 may be performed by an exclusive resources component as described with reference to FIGS. 5 through 7.

At block 1115 the UE 115 or base station 105 may identify a second plurality of sub-intervals in the frame for prioritized use by the network operating entity. The operations of block 1115 may be performed according to the methods described with reference to FIGS. 1 through 4. In some examples, aspects of the operations of block 1115 may be performed by a prioritized resources component as described with reference to FIGS. 5 through 7.

At block 1120 the UE 115 or base station 105 may identify a third plurality of sub-intervals in the frame for opportunistic use by the network operating entity. The operations of block 1120 may be performed according to the methods described with reference to FIGS. 1 through 4. In some examples, aspects of the operations of block 1120 may be performed by an unassigned resources component as described with reference to FIGS. 5 through 7.

At block 1125 the UE 115 or base station 105 may measure for communications from other network operating entities during at least one of the third plurality of sub-intervals. The operations of block 1125 may be performed according to the methods described with reference to FIGS. 1 through 4. In some examples, aspects of the operations of block 1130 may be performed by a medium sensing component as described with reference to FIGS. 5 through 7.

At block 1130 the UE 115 or base station 105 may determine, based at least in part on the measuring, an absence of communications from the other network operating entities during the at least one of the third plurality of sub-intervals. The operations of block 1130 may be performed according to the methods described with reference to FIGS. 1 through 4. In some examples, aspects of the operations of block 1130 may be performed by a medium sensing component as described with reference to FIGS. 5 through 7.

At block 1135 the UE 115 or base station 105 may communicate data during the at least one of the third plurality of sub-intervals based at least in part on the determining. The operations of block 1135 may be performed according to the methods described with reference to FIGS. 1 through 4. In some examples, aspects of the operations of block 1135 may be performed by a communications component as described with reference to FIGS. 5 through 7.

Figure 12:
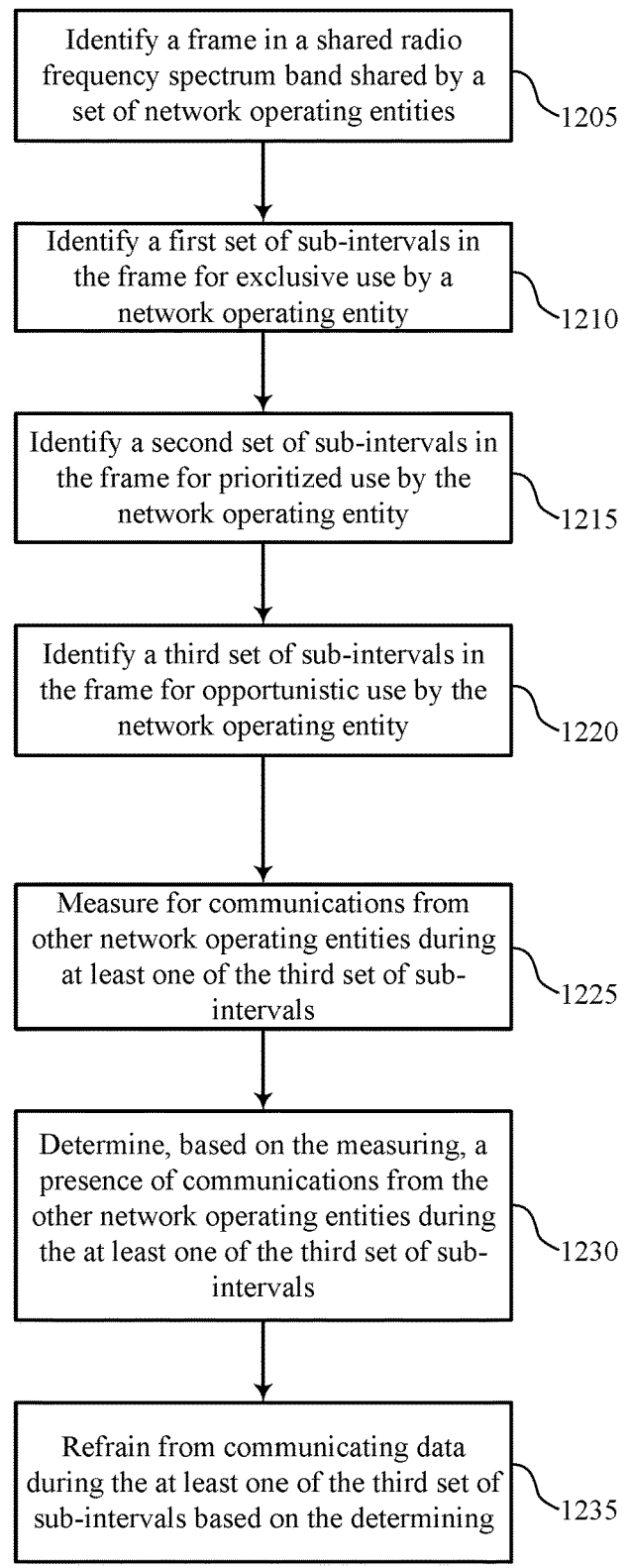

FIG. 12 shows a flowchart illustrating a method 1200 for coordinated resource partitioning in accordance with aspects of the present disclosure. The operations of method 1200 may be implemented by a UE 115 or base station 105 or its components as described herein. For example, the operations of method 1200 may be performed by a communications manager as described with reference to FIGS. 5 through 7. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At block 1205 the UE 115 or base station 105 may identify a frame in a shared radio frequency spectrum band shared by a plurality of network operating entities. The operations of block 1205 may be performed according to the methods described with reference to FIGS. 1 through 4. In some examples, aspects of the operations of block 1205 may be performed by a shared spectrum component as described with reference to FIGS. 5 through 7.

At block 1210 the UE 115 or base station 105 may identify a first plurality of sub-intervals in the frame for exclusive use by a network operating entity. The operations of block 1210 may be performed according to the methods described with reference to FIGS. 1 through 4. In some examples, aspects of the operations of block 1210 may be performed by an exclusive resources component as described with reference to FIGS. 5 through 7.

At block 1215 the UE 115 or base station 105 may identify a second plurality of sub-intervals in the frame for prioritized use by the network operating entity. The operations of block 1215 may be performed according to the methods described with reference to FIGS. 1 through 4. In some examples, aspects of the operations of block 1215 may be performed by a prioritized resources component as described with reference to FIGS. 5 through 7.

At block 1220 the UE 115 or base station 105 may identify a third plurality of sub-intervals in the frame for opportunistic use by the network operating entity. The operations of block 1220 may be performed according to the methods described with reference to FIGS. 1 through 4. In some examples, aspects of the operations of block 1220 may be performed by a unassigned resources component as described with reference to FIGS. 5 through 7.

At block 1225 the UE 115 or base station 105 may measure for communications from other network operating entities during at least one of the third plurality of sub-intervals. The operations of block 1225 may be performed according to the methods described with reference to FIGS. 1 through 4. In some examples, aspects of the operations of block 1225 may be performed by a medium sensing component as described with reference to FIGS. 5 through 7.

At block 1230 the UE 115 or base station 105 may determine, based at least in part on the measuring, a presence of communications from the other network operating entities during the at least one of the third plurality of sub-intervals. The operations of block 1230 may be performed according to the methods described with reference to FIGS. 1 through 4. In some examples, aspects of the operations of block 1230 may be performed by a medium sensing component as described with reference to FIGS. 5 through 7.

At block 1235 the UE 115 or base station 105 may refrain from communicating data during the at least one of the third plurality of sub-intervals based at least in part on the determining. The operations of block 1235 may be performed according to the methods described with reference to FIGS. 1 through 4. In some examples, aspects of the operations of block 1235 may be performed by a communications component as described with reference to FIGS. 5 through 7.

Figure 13:
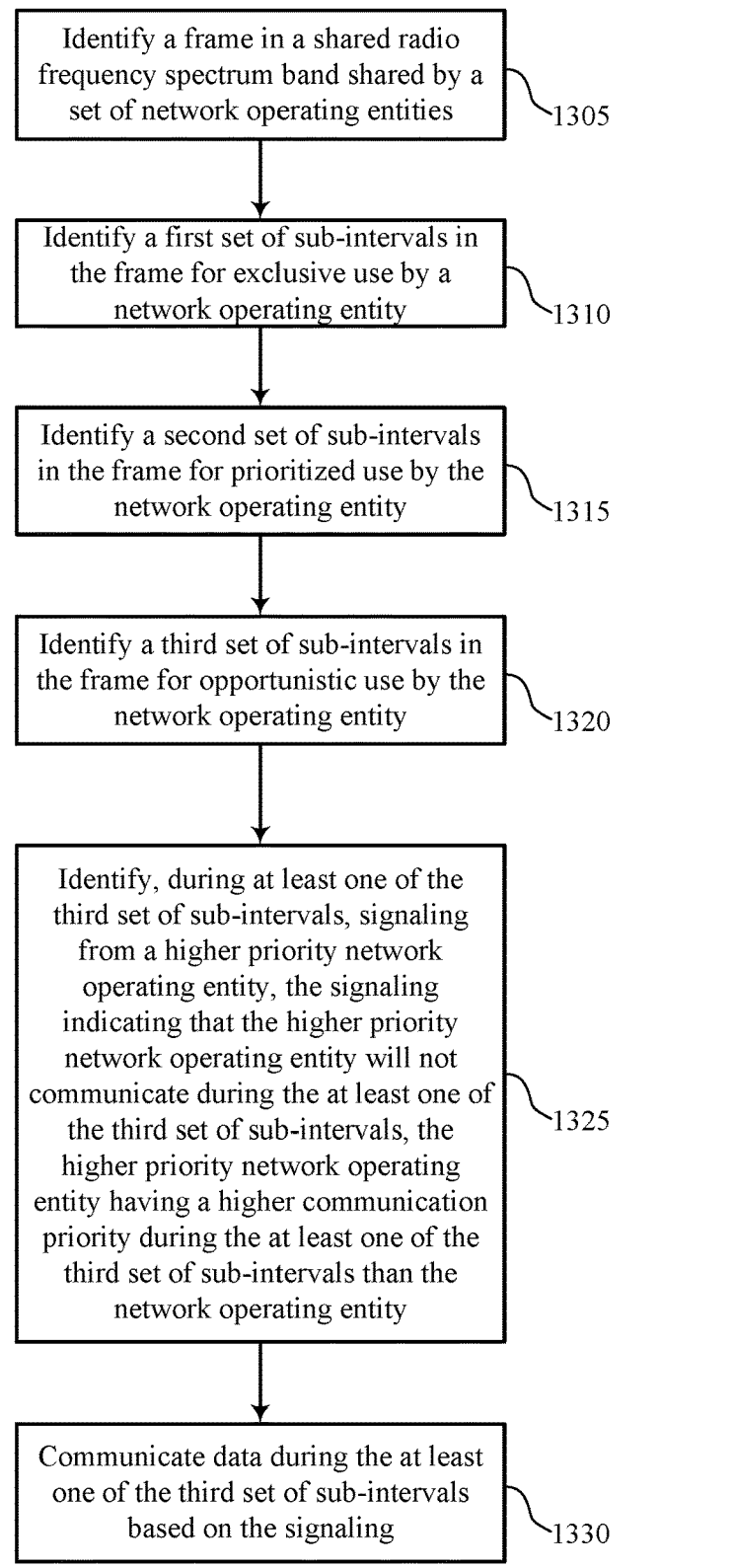

FIG. 13 shows a flowchart illustrating a method 1300 for coordinated resource partitioning in accordance with aspects of the present disclosure. The operations of method 1300 may be implemented by a UE 115 or base station 105 or its components as described herein. For example, the operations of method 1300 may be performed by a communications manager as described with reference to FIGS. 5 through 7. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At block 1305 the UE 115 or base station 105 may identify a frame in a shared radio frequency spectrum band shared by a plurality of network operating entities. The operations of block 1305 may be performed according to the methods described with reference to FIGS. 1 through 4. In some examples, aspects of the operations of block 1305 may be performed by a shared spectrum component as described with reference to FIGS. 5 through 7.

At block 1310 the UE 115 or base station 105 may identify a first plurality of sub-intervals in the frame for exclusive use by a network operating entity. The operations of block 1310 may be performed according to the methods described with reference to FIGS. 1 through 4. In some examples, aspects of the operations of block 1310 may be performed by an exclusive resources component as described with reference to FIGS. 5 through 7.

At block 1315 the UE 115 or base station 105 may identify a second plurality of sub-intervals in the frame for prioritized use by the network operating entity. The operations of block 1315 may be performed according to the methods described with reference to FIGS. 1 through 4. In some examples, aspects of the operations of block 1315 may be performed by a prioritized resources component as described with reference to FIGS. 5 through 7.

At block 1320 the UE 115 or base station 105 may identify a third plurality of sub-intervals in the frame for opportunistic use by the network operating entity. The operations of block 1320 may be performed according to the methods described with reference to FIGS. 1 through 4. In some examples, aspects of the operations of block 1320 may be performed by an unassigned resources component as described with reference to FIGS. 5 through 7.

At block 1325 the UE 115 or base station 105 may identify, during at least one of the third plurality of sub-intervals, signaling from a higher priority network operating entity, the signaling indicating that the higher priority network operating entity will not communicate during the at least one of the third plurality of sub-intervals, the higher priority network operating entity having a higher communication priority during the at least one of the third plurality of sub-intervals than the network operating entity. The operations of block 1325 may be performed according to the methods described with reference to FIGS. 1 through 4. In some examples, aspects of the operations of block 1325 may be performed by a medium sensing component as described with reference to FIGS. 5 through 7.

At block 1330 the UE 115 or base station 105 may communicate data during the at least one of the third plurality of sub-intervals based at least in part on the signaling. The operations of block 1330 may be performed according to the methods described with reference to FIGS. 1 through 4. In some examples, aspects of the operations of block 1330 may be performed by a communications component as described with reference to FIGS. 5 through 7.

Figure 14:
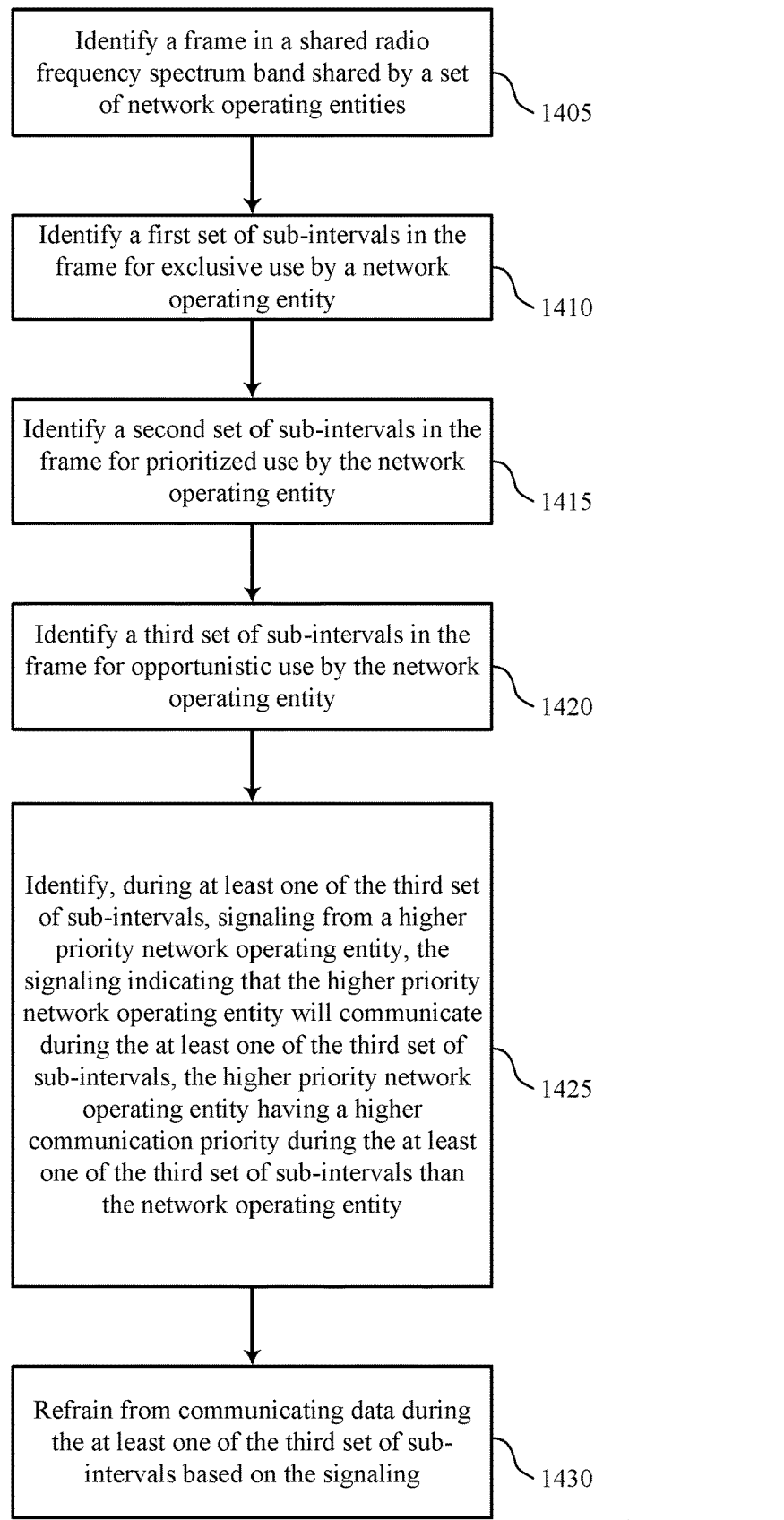

FIG. 14 shows a flowchart illustrating a method 1400 for coordinated resource partitioning in accordance with aspects of the present disclosure. The operations of method 1400 may be implemented by a UE 115 or base station 105 or its components as described herein. For example, the operations of method 1400 may be performed by a communications manager as described with reference to FIGS. 5 through 7. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At block 1405 the UE 115 or base station 105 may identify a frame in a shared radio frequency spectrum band shared by a plurality of network operating entities. The operations of block 1405 may be performed according to the methods described with reference to FIGS. 1 through 4. In some examples, aspects of the operations of block 1405 may be performed by a shared spectrum component as described with reference to FIGS. 5 through 7.

At block 1410 the UE 115 or base station 105 may identify a first plurality of sub-intervals in the frame for exclusive use by a network operating entity. The operations of block 1410 may be performed according to the methods described with reference to FIGS. 1 through 4. In some examples, aspects of the operations of block 1410 may be performed by an exclusive resources component as described with reference to FIGS. 5 through 7.

At block 1415 the UE 115 or base station 105 may identify a second plurality of sub-intervals in the frame for prioritized use by the network operating entity. The operations of block 1415 may be performed according to the methods described with reference to FIGS. 1 through 4. In some examples, aspects of the operations of block 1415 may be performed by a prioritized resources component as described with reference to FIGS. 5 through 7.

At block 1420 the UE 115 or base station 105 may identify a third plurality of sub-intervals in the frame for opportunistic use by the network operating entity. The operations of block 1420 may be performed according to the methods described with reference to FIGS. 1 through 4. In some examples, aspects of the operations of block 1420 may be performed by an unassigned resources component as described with reference to FIGS. 5 through 7.

At block 1425 the UE 115 or base station 105 may identify, during at least one of the third plurality of sub-intervals, signaling from a higher priority network operating entity, the signaling indicating that the higher priority network operating entity will communicate during the at least one of the third plurality of sub-intervals, the higher priority network operating entity having a higher communication priority during the at least one of the third plurality of sub-intervals than the network operating entity. The operations of block 1425 may be performed according to the methods described with reference to FIGS. 1 through 4. In some examples, aspects of the operations of block 1425 may be performed by a medium sensing component as described with reference to FIGS. 5 through 7.

At block 1430 the UE 115 or base station 105 may refrain from communicating data during the at least one of the third plurality of sub-intervals based at least in part on the signaling. The operations of block 1430 may be performed according to the methods described with reference to FIGS. 1 through 4. In some examples, aspects of the operations of block 1430 may be performed by a communications component as described with reference to FIGS. 5 through 7.

Figure 15:
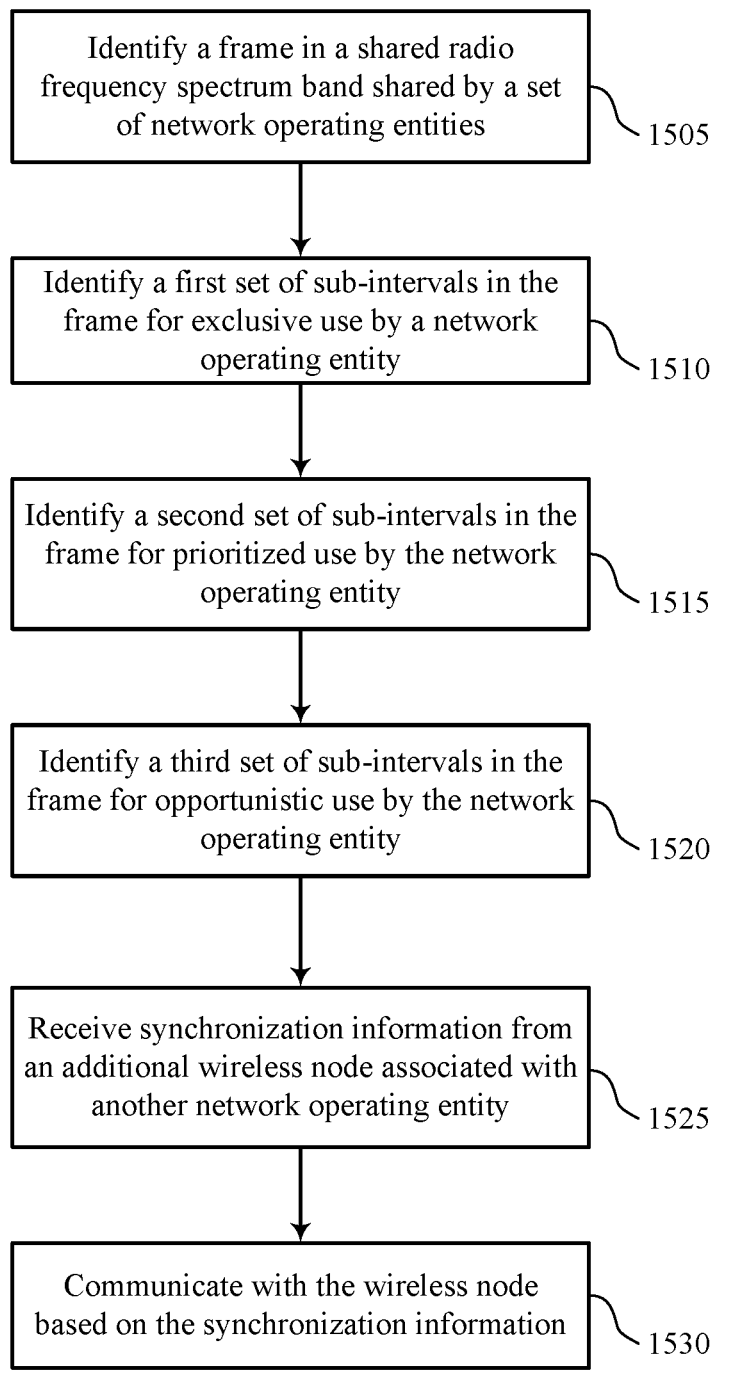

FIG. 15 shows a flowchart illustrating a method 1500 for coordinated resource partitioning in accordance with aspects of the present disclosure. The operations of method 1500 may be implemented by a UE 115 or base station 105 or its components as described herein. For example, the operations of method 1500 may be performed by a communications manager as described with reference to FIGS. 5 through 7. In some examples, a UE 115 or base station 105 may execute a set of codes to control the functional elements of the device to perform the functions described below. Additionally or alternatively, the UE 115 or base station 105 may perform aspects of the functions described below using special-purpose hardware.

At block 1505 the UE 115 or base station 105 may identify a frame in a shared radio frequency spectrum band shared by a plurality of network operating entities. The operations of block 1505 may be performed according to the methods described with reference to FIGS. 1 through 4. In some examples, aspects of the operations of block 1505 may be performed by a shared spectrum component as described with reference to FIGS. 5 through 7.

At block 1510 the UE 115 or base station 105 may identify a first plurality of sub-intervals in the frame for exclusive use by a network operating entity. The operations of block 1510 may be performed according to the methods described with reference to FIGS. 1 through 4. In some examples, aspects of the operations of block 1510 may be performed by an exclusive resources component as described with reference to FIGS. 5 through 7.

At block 1515 the UE 115 or base station 105 may identify a second plurality of sub-intervals in the frame for prioritized use by the network operating entity. The operations of block 1515 may be performed according to the methods described with reference to FIGS. 1 through 4. In some examples, aspects of the operations of block 1515 may be performed by a prioritized resources component as described with reference to FIGS. 5 through 7.

At block 1520 the UE 115 or base station 105 may identify a third plurality of sub-intervals in the frame for opportunistic use by the network operating entity. The operations of block 1520 may be performed according to the methods described with reference to FIGS. 1 through 4. In some examples, aspects of the operations of block 1520 may be performed by an unassigned resources component as described with reference to FIGS. 5 through 7.

At block 1525 the UE 115 or base station 105 may receive synchronization information from an additional wireless node associated with another network operating entity. The operations of block 1525 may be performed according to the methods described with reference to FIGS. 1 through 4. In some examples, aspects of the operations of block 1525 may be performed by a synchronization component as described with reference to FIGS. 5 through 7.

At block 1530 the UE 115 or base station 105 may communicate with the wireless node based at least in part on the synchronization information. The operations of block 1530 may be performed according to the methods described with reference to FIGS. 1 through 4. In some examples, aspects of the operations of block 1530 may be performed by a communications component as described with reference to FIGS. 5 through 7.

In some examples, aspects from two or more of the methods 1000, 1100, 1200, 1300, 1400 and 1500 described with reference to FIGS. 10-15 may be combined. It should be noted that the methods 1000, 1100, 1200, 1300, 1400 and 1500 are just example implementations, and that the operations of the methods 1000, 1100, 1200, 1300, 1400 and 1500 may be rearranged or otherwise modified such that other implementations are possible.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are releases of UMTS that use E-UTRA. UTRA, E-UTRA, UMTS, LTE, LTE-A, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE system may be described for purposes of example, and LTE terminology may be used in much of the description, the techniques described herein are applicable beyond LTE applications.

In LTE/LTE-A networks, including such networks described herein, the term evolved node B (eNB) may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   identifying a frame in a shared radio frequency spectrum band shared by a plurality of network operating entities;
   identifying a first plurality of sub-intervals in the frame for exclusive use by a network operating entity;
   identifying a second plurality of sub-intervals in the frame for prioritized use by the network operating entity, wherein the prioritized use is associated with a medium-sensing procedure used by at least one other network operating entity other than the network operating entity;
   identifying a third plurality of sub-intervals in the frame for opportunistic use by the network operating entity, wherein the opportunistic use is associated with a medium-sensing procedure used by any of the plurality of network operating entities and with priority signaling from any of the plurality of network operating entities;
   identifying, during at least one of the third plurality of sub-intervals, priority signaling from a second network operating entity having a communication priority different from a communication priority of the network operating entity, the priority signaling indicating whether the second network operating entity intends to communicate during the at least one of the third plurality of sub-intervals; and communicating, using one of the identified sub-intervals, with a wireless node associated with the network operating entity.

2. The method of claim 1, further comprising:
communicating control information with the wireless node during at least one of the first plurality of sub-intervals.

3. The method of claim 2, wherein the control information comprises synchronization information, system information, paging information, random access information, or a combination thereof.

4. The method of claim 1, further comprising:
communicating data with the wireless node during at least one of the second plurality of sub-intervals.

5. The method of claim 1, further comprising:
communicating control information, paging information, or both with the wireless node during the at least one of the second plurality of sub-intervals.

6. The method of claim 1, wherein a location of at least the first plurality of sub-intervals, the second plurality of sub-intervals, or the third plurality of sub-intervals within the frame is determined by a network operating entity coordinator.

7. The method of claim 6, wherein the network operating entity coordinator comprises a spectrum access system (SAS).

8. The method of claim 1, wherein a location of at least the first plurality of sub-intervals, the second plurality of sub-intervals, or the third plurality of sub-intervals within the frame is autonomously determined based at least in part on a number of the plurality of network operating entities.

9. The method of claim 1, further comprising:
measuring for communications from other network operating entities during at least one of the third plurality of sub-intervals.

10. The method of claim 9, further comprising:
determining, based at least in part on the measuring, an absence of communications from the other network operating entities during the at least one of the third plurality of sub-intervals; and
communicating data during the at least one of the third plurality of sub-intervals based at least in part on the determining.

11. The method of claim 9, further comprising:
determining, based at least in part on the measuring, a presence of communications from the other network operating entities during the at least one of the third plurality of sub-intervals; and
refraining from communicating data during the at least one of the third plurality of sub-intervals based at least in part on the determining.

12. The method of claim 9, wherein the measuring for communications comprises a listen-before-talk (LBT) procedure.

13. The method of claim 1, wherein identifying, during at least one of the third plurality of sub-intervals comprises:
identifying, during the at least one of the third plurality of sub-intervals, the priority signaling from the second priority network operating entity, the priority signaling indicating that the second network operating entity will not communicate during the at least one of the third plurality of sub-intervals, the second network operating entity having a higher communication priority during the at least one of the third plurality of sub-intervals than the network operating entity; and
communicating data during the at least one of the third plurality of sub-intervals based at least in part on the priority signaling.

14. The method of claim 1, wherein identifying, during at least one of the third plurality of sub-intervals comprises:
identifying, during the at least one of the third plurality of sub-intervals, the priority signaling from the second network operating entity, the priority signaling indicating that the second network operating entity will communicate during the at least one of the third plurality of sub-intervals, the second network operating entity having a higher communication priority during the at least one of the third plurality of sub-intervals than the network operating entity; and
refraining from communicating data during the at least one of the third plurality of sub-intervals based at least in part on the priority signaling.

15. The method of claim 1, further comprising:
transmitting, by the network operating entity, an indication to a lower priority network operating entity that communication with the wireless node will occur during the at least one of the second plurality of sub-intervals, the lower priority network operating entity having a lower communication priority than the network operating entity during the at least one of the second plurality of sub-intervals.

16. The method of claim 1, further comprising:
indicating to a lower priority network operating entity that communication with the wireless node will not occur during at least one of the second plurality of sub-intervals, the lower priority network operating entity having a lower communication priority during the at least one of the second plurality of sub-intervals than the network operating entity.

17. The method of claim 1, further comprising:
receiving synchronization information from an additional wireless node associated with another network operating entity; and
communicating with the wireless node based at least in part on the synchronization information.

18. The method of claim 1, further comprising:
communicating with the wireless node using coordinated multi-point communication.

19. An apparatus for wireless communication, in a system comprising:
a processor;
memory in electronic communication with the processor; and
instructions stored in the memory and operable, when executed by the processor, to cause the apparatus to:
identify a frame in a shared radio frequency spectrum band shared by a plurality of network operating entities;
identify a first plurality of sub-intervals in the frame for exclusive use by a network operating entity;
identify a second plurality of sub-intervals in the frame for prioritized use by the network operating entity, wherein the prioritized use is associated with a medium-sensing procedure used by at least one other network operating entity other than the network operating entity;
identify a third plurality of sub-intervals in the frame for opportunistic use by the network operating entity, wherein the opportunistic use is associated with a medium-sensing procedure used by any of the plurality of network operating entities and with priority signaling from any of the plurality of network operating entities;

identify, during at least one of the third plurality of sub-intervals, priority signaling from a second network operating entity having a communication priority different from a communication priority of the network operating entity, the priority signaling indicating whether the second network operating entity intends to communicate during the at least one of the third plurality of sub-intervals; and communicate, using one of the identified sub-intervals, with a wireless node associated with the network operating entity.

20. The apparatus of claim 19, wherein the instructions are further executable by the processor to cause the apparatus to:

communicate control information with the wireless node during at least one of the first plurality of sub-intervals.

21. The apparatus of claim 19, wherein the instructions are further executable by the processor to cause the apparatus to:

communicate data with the wireless node during at least one of the second plurality of sub-intervals.

22. The apparatus of claim 19, wherein the instructions are further executable by the processor to cause the apparatus to:

measure for communications from other network operating entities during at least one of the third plurality of sub-intervals.

23. The apparatus of claim 22, wherein the instructions are further executable by the processor to cause the apparatus to:

determine, based at least in part on the measuring, an absence of communications from the other network operating entities during the at least one of the third plurality of sub-intervals; and communicate data during the at least one of the third plurality of sub-intervals based at least in part on the determining.

24. The apparatus of claim 22, wherein the instructions are further executable by the processor to cause the apparatus to:

determine, based at least in part on the measuring, a presence of communications from the other network operating entities during the at least one of the third plurality of sub-intervals; and refrain from communicating data during the at least one of the third plurality of sub-intervals based at least in part on the determining.

25. The apparatus of claim 19, wherein the instructions are further executable by the processor to cause the apparatus to:

identify, during the at least one of the third plurality of sub-intervals, the priority signaling from the second priority network operating entity, the priority signaling indicating that the second network operating entity will not communicate during the at least one of the third plurality of sub-intervals, the second network operating entity having a higher communication priority during the at least one of the third plurality of sub-intervals than the network operating entity; and communicate data during the at least one of the third plurality of sub-intervals based at least in part on the priority signaling.

26. The apparatus of claim 19, wherein the instructions are further executable by the processor to cause the apparatus to:

identify, during the at least one of the third plurality of sub-intervals, the priority signaling from the second priority network operating entity, the priority signaling indicating that the second network operating entity will communicate during the at least one of the third plurality of sub-intervals, the second network operating entity having a higher communication priority during the at least one of the third plurality of sub-intervals than the network operating entity; and refrain from communicating data during the at least one of the third plurality of sub-intervals based at least in part on the priority signaling.

27. The apparatus of claim 19, wherein the instructions are further executable by the processor to cause the apparatus to:

transmit, by the network operating entity, an indication to a lower priority network operating entity that communication with the wireless node will occur during the at least one of the second plurality of sub-intervals, the lower priority network operating entity having a lower communication priority than the network operating entity during the at least one of the second plurality of sub-intervals.

28. The apparatus of claim 19, wherein the instructions are further executable by the processor to cause the apparatus to:

indicate to a lower priority network operating entity that communication with the wireless node will not occur during at least one of the second plurality of sub-intervals, the lower priority network operating entity having a lower communication priority during the at least one of the second plurality of sub-intervals than the network operating entity.

29. An apparatus for wireless communication, comprising:

means for identifying a frame in a shared radio frequency spectrum band shared by a plurality of network operating entities;

means for identifying a first plurality of sub-intervals in the frame for exclusive use by a network operating entity;

means for identifying a second plurality of sub-intervals in the frame for prioritized use by the network operating entity, wherein the prioritized use is associated with a medium-sensing procedure used by at least one other network operating entity other than the network operating entity;

means for identifying a third plurality of sub-intervals in the frame for opportunistic use by the network operating entity, wherein the opportunistic use is associated with a medium-sensing procedure used by any of the plurality of network operating entities and with priority signaling from any of the plurality of network operating entities;

means for identifying, during at least one of the third plurality of sub-intervals, priority signaling from a second network operating entity having a communication priority different from a communication priority of the network operating entity, the priority signaling indicating whether the second network operating entity intends to communicate during the at least one of the third plurality of sub-intervals; and means for communicating, using one of the identified sub-intervals, with a wireless node associated with the network operating entity.

30. A non-transitory computer readable medium storing code for wireless communication, the code comprising instructions executable by a processor to:

identify a frame in a shared radio frequency spectrum band shared by a plurality of network operating entities;

identify a first plurality of sub-intervals in the frame for exclusive use by a network operating entity;

identify a second plurality of sub-intervals in the frame for prioritized use by the network operating entity, wherein the prioritized use is associated with a medium-sensing procedure used by at least one other network operating entity other than the network operating entity;

identify a third plurality of sub-intervals in the frame for opportunistic use by the network operating entity, wherein the opportunistic use is associated with a medium-sensing procedure used by any of the plurality of network operating entities and with priority signaling from any of the plurality of network operating entities;

identify, during at least one of the third plurality of sub-intervals, priority signaling from a second network operating entity having a communication priority different from a communication priority of the network operating entity, the priority signaling indicating whether the second network operating entity intends to communicate during the at least one of the third plurality of sub-intervals; and communicate, using one of the identified sub-intervals, with a wireless node associated with the network operating entity.

* * * * *